(12) United States Patent
Chaturvedi et al.

(10) Patent No.: US 9,356,972 B1
(45) Date of Patent: May 31, 2016

(54) SYSTEM AND METHOD FOR PROVIDING ENTERPRISE VOICE CALL CONTINUITY

(71) Applicant: DAMAKA, INC., Richardson, TX (US)

(72) Inventors: Sivakumar Chaturvedi, Allen, TX (US); Satish Gundabathula, Irving, TX (US)

(73) Assignee: DAMAKA, INC., Richardson, TX (US)

(*) Notice: Subject to any disclaimer, the term of this patent is extended or adjusted under 35 U.S.C. 154(b) by 0 days.

(21) Appl. No.: 14/943,186

(22) Filed: Nov. 17, 2015

Related U.S. Application Data

(63) Continuation of application No. 12/762,106, filed on Apr. 16, 2010, now Pat. No. 9,191,416.

(51) Int. Cl.
| | |
|---|---|
| *H04L 12/66* | (2006.01) |
| *H04Q 3/62* | (2006.01) |
| *H04L 12/46* | (2006.01) |
| *H04L 29/06* | (2006.01) |
| *H04M 3/42* | (2006.01) |
| *H04M 7/12* | (2006.01) |

(52) U.S. Cl.
CPC .......... *H04L 65/102* (2013.01); *H04L 65/1006* (2013.01); *H04L 65/1066* (2013.01); *H04M 3/42314* (2013.01); *H04M 7/123* (2013.01)

(58) Field of Classification Search
CPC .. H04W 88/16; H04W 92/06; H04L 65/1023; H04M 7/006
See application file for complete search history.

(56) References Cited

U.S. PATENT DOCUMENTS

| | | | |
|---|---|---|---|
| 5,442,637 | A | 8/1995 | Nguyen |
| 5,761,309 | A | 6/1998 | Ohashi et al. |
| 5,790,637 | A | 8/1998 | Johnson et al. |
| 5,818,447 | A | 10/1998 | Wolf et al. |
| 5,889,762 | A | 3/1999 | Pajuvirta et al. |
| 6,031,818 | A | 2/2000 | Lo et al. |
| 6,128,283 | A | 10/2000 | Sabaa et al. |
| 6,141,687 | A | 10/2000 | Blair |
| 6,161,082 | A | 12/2000 | Goldberg et al. |
| 6,195,694 | B1 | 2/2001 | Chen et al. |
| 6,202,084 | B1 | 3/2001 | Kumar et al. |

(Continued)

FOREIGN PATENT DOCUMENTS

| | | |
|---|---|---|
| EP | 1404082 A2 | 3/2004 |
| EP | 160339 A1 | 12/2005 |

(Continued)

OTHER PUBLICATIONS

PCT: International Search Report and Written Opinion for PCT/US2011/024870; Oct. 26, 2011; 12 pages.

(Continued)

*Primary Examiner* — Asad Nawaz
*Assistant Examiner* — Jason Harley
(74) *Attorney, Agent, or Firm* — Howison & Arnott, LLP

(57) ABSTRACT

An improved system and method are disclosed for providing voice call continuity in an enterprise network. For example, an enterprise public branch exchange (PBX) may be configured with a pilot number that is used to provide VCC services when called by a client. Digit collection via DMTF signaling or other means may be used to collect destination information from the client. The enterprise network may use the collected digits to establish a communication session with another device that corresponds to the destination information.

1 Claim, 16 Drawing Sheets

(56) References Cited

U.S. PATENT DOCUMENTS

| | | |
|---|---|---|
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznanski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,606,112 B1 | 8/2003 | Falco |
| 6,741,691 B1 | 5/2004 | Ritter et al. |
| 6,754,181 B1 | 6/2004 | Elliott et al. |
| 6,766,373 B1 | 7/2004 | Beadle |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 8,200,796 B1 | 6/2012 | Margulis |
| 8,407,576 B1 | 3/2013 | Yin et al. |
| 2001/0050923 A1 | 12/2001 | Park et al. |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0124096 A1 | 9/2002 | Loguinov et al. |
| 2002/0143548 A1 | 10/2002 | Korall et al. |
| 2002/0150110 A1 | 10/2002 | Inbar et al. |
| 2002/0152325 A1 | 10/2002 | Elgebaly et al. |
| 2002/0156844 A1 | 10/2002 | Maehiro |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0212772 A1 | 11/2003 | Harris |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2003/0229715 A1 | 12/2003 | Baratakke et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | LaVallee et al. |
| 2004/0044517 A1 | 3/2004 | Palmquist |
| 2004/0052234 A1 | 3/2004 | Ameigeiras et al. |
| 2004/0062267 A1 | 4/2004 | Minami et al. |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |
| 2004/0143678 A1 | 7/2004 | Chari et al. |
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249885 A1 | 12/2004 | Petropoulakis et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |

(56) References Cited

U.S. PATENT DOCUMENTS

| | | |
|---|---|---|
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1* | 6/2006 | Jagadeesan ............ H04W 36/14 455/439 |
| 2006/0121986 A1 | 6/2006 | Pelkey et al. |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0233117 A1 | 10/2006 | Tomsu et al. |
| 2006/0246903 A1 | 11/2006 | Kong et al. |
| 2006/0258289 A1 | 11/2006 | Dua |
| 2007/0014281 A1* | 1/2007 | Kant ................ H04L 29/06027 370/352 |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0280253 A1 | 12/2007 | Rooholamini et al. |
| 2007/0294626 A1 | 12/2007 | Fletcher et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0046984 A1 | 2/2008 | Bohmer et al. |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0244718 A1 | 10/2008 | Frost et al. |
| 2008/0250408 A1 | 10/2008 | Tsui et al. |
| 2008/0273541 A1 | 11/2008 | Pharn |
| 2008/0320096 A1 | 12/2008 | Szeto |
| 2008/0320565 A1 | 12/2008 | Buch et al. |
| 2009/0003322 A1 | 1/2009 | Isumi |
| 2009/0006076 A1 | 1/2009 | Jindal |
| 2009/0052399 A1* | 2/2009 | Silver ................ H04W 36/0022 370/331 |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Vizaei |
| 2010/0049980 A1 | 2/2010 | Barriga et al. |
| 2010/0077023 A1 | 3/2010 | Eriksson |
| 2010/0107205 A1 | 4/2010 | Foti |
| 2010/0174783 A1 | 7/2010 | Zarom |
| 2010/0191954 A1 | 7/2010 | Kim et al. |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0141220 A1 | 6/2011 | Miura |
| 2011/0145687 A1 | 6/2011 | Grigsby et al. |
| 2011/0307556 A1 | 12/2011 | Chaturvedi et al. |
| 2011/0314134 A1 | 12/2011 | Foti |
| 2011/0320821 A1 | 12/2011 | Alkhatib et al. |
| 2012/0078609 A1 | 3/2012 | Chaturvedi et al. |
| 2012/0124191 A1 | 5/2012 | Lyon |
| 2012/0263144 A1 | 10/2012 | Nix |
| 2013/0067004 A1 | 3/2013 | Logue et al. |
| 2013/0106989 A1 | 5/2013 | Gage et al. |
| 2013/0111064 A1 | 5/2013 | Mani et al. |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2007-043598 | 2/2007 |
| KR | 10-2005-0030548 | 3/2005 |
| WO | WO 03/079635 | 9/2003 |
| WO | WO 2004/063843 | 7/2004 |
| WO | WO 2005/009019 | 1/2005 |

(56) References Cited

FOREIGN PATENT DOCUMENTS

| WO | 2006064047 A1 | 6/2006 |
|---|---|---|
| WO | WO 2006/075677 | 7/2006 |
| WO | WO 2008099420 A2 | 8/2008 |

OTHER PUBLICATIONS

J. Rosenberg et al. "Session Traversal Utilities for NAT (STUN)", draft-ieff-behave-rfc3489bis-06, Mar. 5, 2007.
PCT: International Search Report and Written Opinion for PCT/US2011/028685; Nov. 9, 2011; 10 pages.
PCT: International Search Report and Written Opinion for PCT/US2011/029954; Nov. 24, 2011; 8 pages.
PCT: International Search Report and Written Opinion for PCT/US2011/024891; Nov. 25, 2011; 9 pages.
PCT: International Search Report and Written Opinion for PCT/US2011/031245; Dec. 26, 2011; 13 pages.
Wireless Application Protocol—Wireless Transport Layer Security Specification, Version Feb. 18, 2000, Wireless Application Forum, Ltd. 2000; 99 pages.
PCT: International Search Report and Written Opinion for PCT/US2011/040864; Feb. 17, 2012; 8 pages.
PCT: International Search Report and Written Opinion for PCT/US2011/041565; Jan. 5, 2012; 7 pages.
PCT: International Search Report and Written Opinion for PCT/US2011/031246; Dec. 27, 2011; 8 pages.
PCT: International Search Report and Written Opinion for PCT/US2011/049000; Mar. 27, 2012; 10 pages.
PCT: International Search Report and Written Opinion for PCT/US2011/051877; Apr. 13, 2012; 7 pages.
PCT: International Search Report and Written Opinion for PCT/US2011/055101; May 22, 2012; 9 pages.
Balamurugan Karpagavinayagam et al. (Monitoring Architecture for Lawful Interception in VoIP Networks, !ICIMP 2007, Aug. 24, 2008).
NiceLog User's Manual 385A0114-08 Rev. A2, Mar. 2004.
WISPA: Wireless Internet Service Providers Association; WISPA-CS-IPNA-2.0; May 1, 2009.
PCT: International Preliminary Report on Patentability of PCT/US2011/024870; Aug. 30, 2012; 7 pgs.
RFC 5694 ("Peer-to-Peer (P2P) Architecture: Definition, Taxonomies, Examples, and Applicability", Nov. 2009).
Mahy et al., The Session Initiation Protocol (SIP) "Replaces" Header, Sep. 2004, RFC 3891, pp. 1-16.
PCT: International Preliminary Report on Patentability of PCT/US2011/024891; Aug. 30, 2012; 6 pgs.
T. Dierks & E. Rescorla, The Transport Layer Security (TLS) Protocol (Ver. 1.2, Aug. 2008) retrieved at http://tools.ietf.org/htmllrfc5246. Relevant pages provided.
J. Rosenberg et al., SIP: Session Initiation Protocol (Jun. 2008) retrieved at http://tools.ieff.org/html/rfc3261. Relevant pages provided.
Philippe Bazot et al., Developing Sip and IP Multimedia Subsystem (IMS) Applications (Feb. 5, 2007) retrieved at redbooks IBM form No. SG24-7255-00. Relevant pages provided.
PCT: International Preliminary Report on Patentability of PCT/US2011/028685; Oct. 4, 2012; 6 pgs.
PCT: International Preliminary Report on Patentability of PCT/US2011/031245; Oct. 26, 2012; 9 pgs.
PCT: International Preliminary Report on Patentability of PCT/US2011/029954; Oct. 11, 2012; 5 pgs.
PCT: International Preliminary Report on Patentability of PCT/US2011/031246; Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.
Cooper et al; "The Effect of NATs on P2PSIP Overlay Architecture"; IETF; IETF draft draft-matthews-p2psip-nats-and-overlays-01.txt; pp. 1-20.
Srisuresh et al; "State of Peer-to-Peer(P2P) Communication Across Network Address Translators(NATs)"; Nov. 19, 2007; I ETF; I ETF draft for RFC 5128, draft-ieff-behave-p2p-state-06.txt; pp. 1-33.
PCT: International Search Report and Written Opinion for PCT/US2012/046026; Oct. 18, 2012; 6 pages.
Dunigan, Tom, "Almost TCP over UDP (atou)," last modified Jan. 12, 2004; retrieved on Jan. 18, 2011 from <http://www.csm.oml.gov/~dunigan/net100/atou.html> 18 pgs.
PCT: International Preliminary Report on Patentability of PCT/US2011/040864; Jan. 3, 2013; 6 pgs.
PCT: International Preliminary Report on Patentability of PCT/US2011/041565; Jan. 10, 2013; 6 pgs.
PCT: International Preliminary Report on Patentability of PCT/US2011/049000; Feb. 26, 2013; 6 pgs.
PCT: International Preliminary Report on Patentability of PCT/US2011/051877; Mar. 26, 2013; 5 pgs.
PCT: International Preliminary Report on Patentability of PCT/US2011/055101; Apr. 16, 2013; 7 pgs.
PCT: International Preliminary Report on Patentability of PCT/US2012/046026; Jan. 30, 2014; 5 pgs.
PCT: International Preliminary Report on Patentability of PCT/US2008/075141; Mar. 9, 2010; 5 pgs.
PCT: International Preliminary Report on Patentability of PCT/US2007/068820; Dec. 31, 2008; 8 pgs.
PCT: International Preliminary Report on Patentability of PCT/US2007/068823; Nov. 27, 2008; 8 pgs.
PCT: International Preliminary Report on Patentability of PCT/US2006/047841; Nov. 6, 2008; 7 pgs.
PCT: International Preliminary Report on Patentability of PCT/US2007/002424; Aug. 7, 2008; 6 pgs.
PCT: International Preliminary Report on Patentability of PCT/US2006/040312; May 2, 2008; 5 pgs.
PCT: International Preliminary Report on Patentability of PCT/IB2005/000821; Oct. 19, 2006; 10 pgs.
Chathapuram, "Security in Peer-To-Peer Networks", Aug. 8. 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN—Simple Traversal of UDP Through Nat", Sep. 2002, XP015005058.
Salman A. Baset, et al, "An Analysis of the Skype Peer-To-Peer Internet Telephony Protocol", Department of computer Science, Columbia University, New York, NY, USA, Sep. 15, 2004.
Singh et al., "Peer-to Peer Internet Telephony Using SIP", Department of Computer Science, Columbia University, Oct. 31, 2004, XP-002336408.

(56) References Cited

OTHER PUBLICATIONS

Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].

Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L;; Fujii, T., "All-SIP Mobility: Session Continuity on Handover in Heterogeneous Access Environment," Vehicular Technology Conference, 2007. VTC 2007—Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41, issue 11, Nov. 2003, pp. 102-108.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

PCT: International Preliminary Report on Patentability of PCT/US2008/084950; Jun. 1, 2010; 5 pgs.

International Search Report and Written Opinion of the International Searching Authority from PCT/US2014/039777, dated Sep. 30, 2014.

International Search Report and Written Opinion of the International Searching Authority from PCT/US2014/39782, dated Oct. 17, 2014.

International Search Report and Written Opinion of PCT/US2015/43633, Oct. 26, 2015, 21 pgs.

PCT: International Search Report and Written Opinion of PCT/US2015/43630 (related application), Oct. 30, 2015, 20 pgs.

PCT: International Preliminary Report on Patentability of PCT/US2014/039777; Jan. 28, 2016; 8 pgs.

\* cited by examiner

SYSTEM AND METHOD FOR PROVIDING ENTERPRISE VOICE CALL CONTINUITY

CROSS-REFERENCE TO RELATED APPLICATIONS

This application is a continuation of U.S. patent application Ser. No. 12/762,106, filed Apr. 16, 2010, entitled SYSTEM AND METHOD FOR PROVIDING ENTERPRISE VOICE CALL CONTINUITY, now U.S. Pat. No. 9,191,416, issued Nov. 17, 2015, the specification of which is incorporated by reference herein in its entirety.

BACKGROUND

Communication networks, such as cellular networks and public switched telephone networks (PSTNs), are generally controlled by an operator. The operator provides services to users who pay for access to the networks. For example, a cellular user may pay for access to a particular cellular network (i.e., a network operated by a particular operator). Such access is commonly provided on a monthly basis or for a certain number of minutes. Other features (i.e., text messages) may also be provided by the operator as part of a package deal or for an additional fee. Similarly, a PSTN user may pay for PSTN access. Operator-controlled networks may include many different types of networks, including cellular networks and networks based on the Internet Protocol (IP) and/or other data protocols.

Businesses, particularly large corporations and similar entities, may provide and maintain enterprise networks. Enterprise networks connect the business's communication devices (e.g., computers) to one another and may be widely dispersed geographically. Enterprise networks may also include a variety of different network types, such as WiFi networks and traditional telephone systems. While the business responsible for the enterprise network may control communications within the enterprise network, connections into and out of the enterprise network generally rely on operator-controlled networks over which the enterprise network has no control.

Accordingly, what is needed are a system and method that provides additional flexibility to enterprise networks.

DETAILED DESCRIPTION

Figure 1:
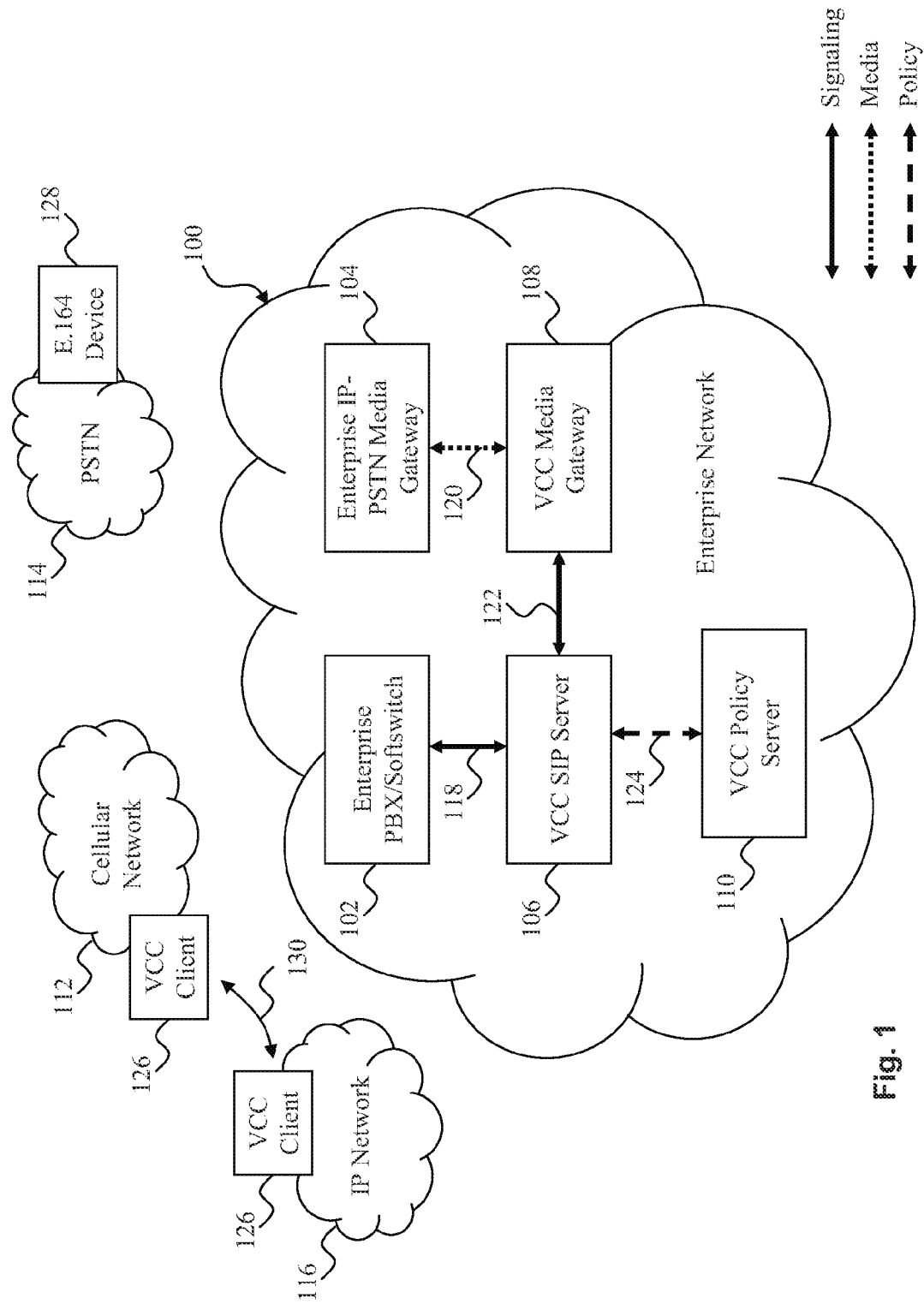
FIG. 1 is a simplified network diagram of one embodiment of an enterprise network and external networks with which the enterprise network may communicate.

The present disclosure is directed to a system and method for providing enterprise voice call continuity. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a portion of an enterprise network 100 is provided. The enterprise network 100 includes various components including an enterprise Private Branch eXchange (PBX)/softswitch 102, an enterprise Internet Protocol-Public Switched Telephone Network (IP-PSTN) media gateway 104, a Voice Call Continuity (VCC) Session Initiation Protocol (SIP) server 106, a VCC media gateway 108, and a VCC policy server 110. It is understood that the functionality provided by the enterprise PBX/softswitch (hereinafter "enterprise PBX") 102, enterprise IP-PSTN media gateway 104, VCC SIP server 106, VCC media gateway 108, and VCC policy server 110 may be combined into fewer network components or spread over more network components. For example, the VCC SIP server 106 and the VCC policy server 110 may be combined with the VCC SIP server 106 having the functionality of the VCC policy server 110 as described below. Accordingly, it is understood that the particular components described herein as part of the enterprise network 100 are used for purposes of example only and the present disclosure is not limited to the illustrated implementation of the enterprise network 100.

The components of the enterprise network 100 are configured to allow clients of the enterprise network to communicate via other networks, such as a cellular network 112, a PSTN 114, and an IP network 116. It is understood that the networks 112, 114, and 116 are only examples and that the enterprise network 100 may communicate with many different types of networks, including IP-based networks and cellular networks such as WiFi networks, WiMAX networks, long term evolution (LTE) networks, local area networks (LANs) (e.g., IEEE 802.11a and 802.11g networks), digital audio broadcasting systems (e.g., HD Radio, T-DMB and ISDB-TSB), terrestrial digital television systems (e.g., DVB-T, DVB-H, T-DMB and ISDB-T), WiMAX wireless metropolitan area networks (MANs) (e.g., IEEE 802.16 networks), Mobile Broadband Wireless Access (MBWA) networks (e.g., IEEE 802.20 networks), Orthogonal Frequency Division Multiplexing (OFDM) systems, Flash-OFDM cellular systems, Ultra wideband (UWB) systems, Global System for Mobile communications (GSM) systems, and/or code division multiple access (CDMA) communications systems. The networks 112, 114, and 116 may incorporate various generations of technologies such as 2G, 3G, and/or 4G communications. The networks 112, 114, and 116 may also use communication technologies not yet developed but compatible with the embodiments described herein. Although not shown, each network 112, 114, and 116 may include one or more transmitters, receivers, switches, routers, servers, and/or other components needed to provide wireless and/or wireless communication capabilities to devices operating within each network.

The enterprise PBX 102 is configured to interact with one or more networks that are external to the enterprise network 100, such as the cellular network 112 and/or the PSTN network 114. The enterprise PBX 102 provides switching (i.e., routing) functionality that enables a VCC client (e.g., a client authorized to operate within the enterprise network 100) to communicate with other VCC clients and/or non-VCC clients in the cellular network 112, PSTN 114, and IP network 116. Within the enterprise network 100, the enterprise PBX 102 communicates signaling information with the VCC SIP server 106 via a path 118.

As will be described below in greater detail, rules for inbound and/or outbound calls may be defined on the enterprise PBX 102. In the present example, the enterprise PBX 102 is associated with one or more pilot numbers that bridge at the enterprise PBX 102. For example, there may be one or more pilot numbers for inbound calls (i.e., calls not originated by a client of the enterprise network 100) and one or more other pilot numbers for outbound calls (i.e., call originated by a client of the enterprise network). When the enterprise PBX 102 receives a call on a pilot number, it may handle the call as will be described in the following embodiments. It is understood that the enterprise PBX 102 may perform many different functions based on how the PBX is configured to handle calls to the pilot number. For example, the enterprise PBX 102 may be configured to connect to an announcement server, a voicemail server, and/or other types of servers.

The enterprise IP-PSTN gateway 104 is configured to provide a media gateway for media paths with the cellular network 112 and the PSTN 114. Within the enterprise network 100, the enterprise IP-PSTN media gateway 104 communicates media information with the VCC media gateway 108 via a path 120.

The VCC SIP server 106 provides SIP functionality to the enterprise network 100. Such SIP functionality ensures that the enterprise network 100 can communicate as defined, for example, in RFC 3261 (provided by the Internet Engineering Task Force (IETF) Network Working Group), which is hereby incorporated by reference in its entirety. Within the enterprise network 100, the VCC SIP server 106 communicates signaling information with the enterprise PBX 102 via the path 118, signaling information with the VCC media gateway 108 via a path 122, and policy information with the VCC policy server 110 via a path 124.

The VCC media gateway 108 provides a gateway for the enterprise network 100 for media connections to and from the IP network 116. The VCC media gateway 108 also anchors media connections to and from the cellular network 112 and the PSTN 114 via the enterprise IP-PSTN media gateway 104. For example, media call legs may be routed through the enterprise IP-PSTN media gateway 104 and anchored on the VCC media gateway 108.

The VCC policy server 110 contains policy information that defines the VCC functions available for a particular VCC client. For example, the enterprise network 100 may define different levels of functionality and may associate a particular VCC client with one or more of those levels. For example, a particular VCC client may have total VCC functionality, limited VCC functionality (e.g., may only access certain networks or may not access certain features such as call forwarding or conference calls), or no VCC functionality. Such policies may be changed as desired for particular VCC clients or for classes of VCC clients.

In the present example, a single VCC client 126 is illustrated as being capable of communicating via both the cellular network 112 and the IP network 116. For example, the VCC client 126 may be a double or triple band cell phone capable of 2G, 3G, and/or 4G communications such as may be provided by cellular, WiFi, WiMAX, and/or LTE connections. The VCC client 126 may also use communication technologies not yet developed but compatible with the embodiments described herein. The VCC client 126 may be a mobile terminal such as a computer (e.g., a laptop or netbook), a cell phone, a personal digital assistant (PDA), a pager, a portable game device, or any other device capable of wireless communications. The VCC client 126 is known to the enterprise network 100 and is associated with a policy stored on the policy server 110. The VCC client 126 may transition between the two networks 112 and 116 as illustrated by arrow 130.

A communication device (e.g., an E.164 device) 128 is illustrated as being coupled to the PSTN 114. As is known, E.164 is a recommendation by the Telecommunication Standardization Sector (ITU-T) that coordinates standards for telecommunications on behalf of the International Telecommunication Union (ITU). The E.164 recommendation defines the international public telecommunication numbering plan used in the PSTN 114 and some other data networks, and also defines the format of telephone numbers. Accordingly, the E.164 device 128 is a device such as a telephone that is capable of communicating via the PSTN 114 using the parameters established by the E.164 recommendation. It is understood that other devices may be used in place of the E.164 device 128 and that the network 114 may not be a PSTN in some embodiments. Furthermore, although described herein as a device that is external to the enterprise network 100 (i.e., not a client of the enterprise network 100), it is understood that the device 128 may be a client of the enterprise network 100 in some embodiments, and that a communication session may be established between two client devices of the enterprise network 100 using variations of the embodiments described herein.

The enterprise network 100 differs from other networks, such as the cellular network 112 and the PSTN 114, in that the operator of a cellular network or PSTN can readily identify a user. For example, in the cellular network 112, the operator may know information such as the cell number associated with a particular authorized device, what subscriptions may be associated with the device, whether the device can send and/or receive short message service (SMS) messages, and similar information. This enables the operator of the cellular network 112 to identify the device when the device logs into the network and to control the behavior of the device and connect it with other devices as needed. Similarly, an E.164 device may be associated with a known telephone number within the PSTN 114. The PSTN 114 may be associated the telephone number with certain functions, such as whether long distance calls or call waiting are enabled for that telephone number.

However, in the enterprise network 100, information such as the cell number and subscription information may not be readily available. Some enterprise networks may request the information from the operator, while others may use other means for obtaining the information. In the present example, rather than obtain the information from the operator, the enterprise PBX 102 is associated with one or more pilot numbers as described above. When the enterprise PBX 102 receives a call on the pilot number, it handles the call as will be described in the following embodiments.

Figure 2:
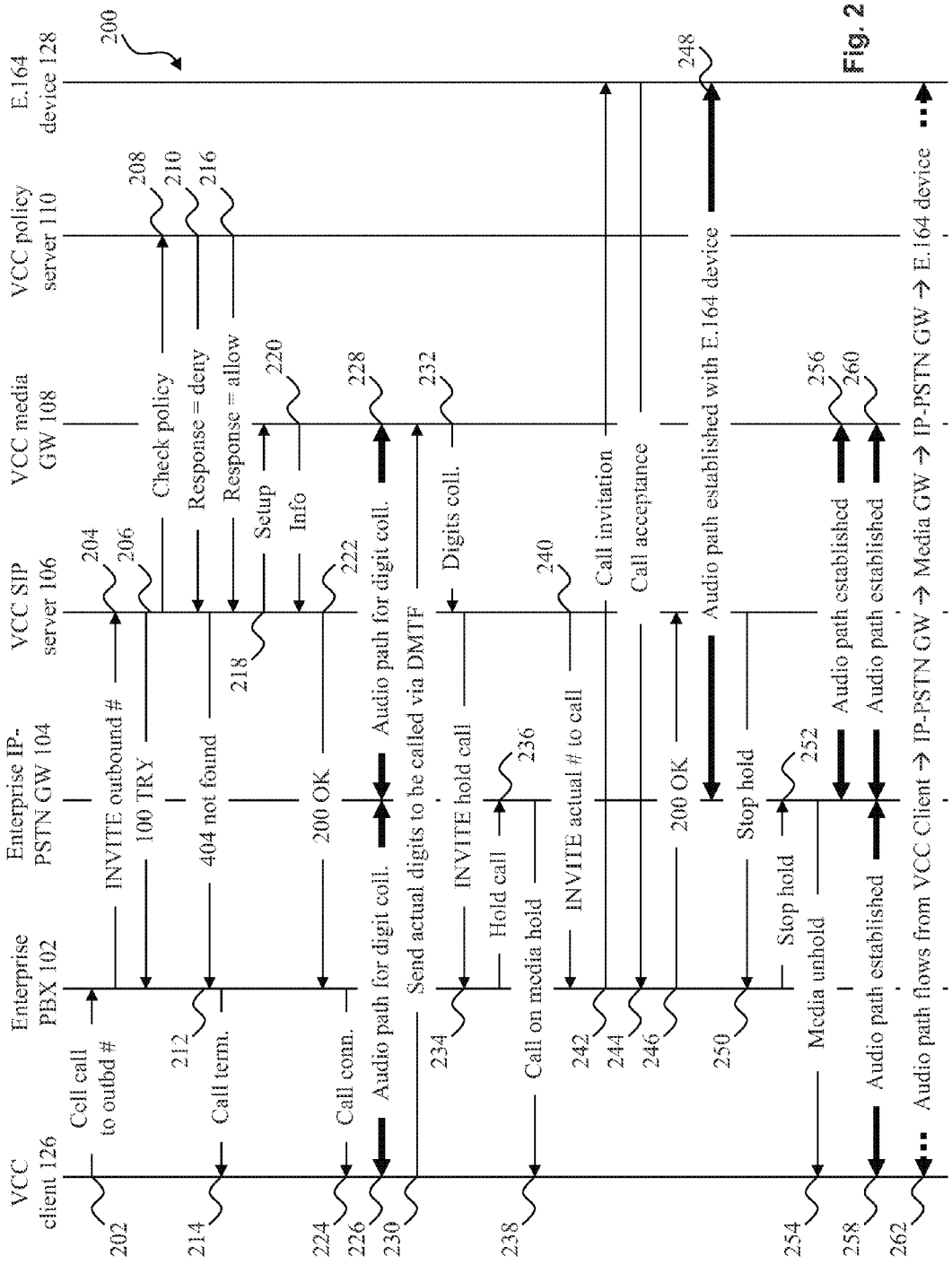
FIG. 2 is a sequence diagram illustrating one embodiment of a sequence of messages that may be used to establish an outbound cellular call between a client of the enterprise network of FIG. 1 and an external device.

Referring to FIG. 2, a sequence diagram illustrates one embodiment of a message sequence 200 that may be used with the enterprise environment 100 of FIG. 1 to place a call from the VCC client 126 to the E.164 device 128. In the present example, the VCC client 126 originates the call from the cellular network 112 and the call is an outbound call from the perspective of the enterprise network 100.

In step 202, the VCC client 126 places a cellular call via the cellular network 112 to the pilot number associated with the enterprise PBX 102. In the present example, the pilot number is an outbound VCC number that is called by a VCC client 126 that wants to place an outbound call via the enterprise network 100. The pilot number is recognized by the enterprise PBX 102, which performs routing for the pilot number as defined by a configuration file of the enterprise PBX 102. For example, the enterprise PBX 102 may be configured to identify a call to the pilot number as a call request for a VCC communication session (e.g., a communication session providing VCC functionality) and so may route the call within the enterprise network 100 in accordance with this identification.

Accordingly, in step 204, the enterprise PBX 102 sends a message, such as a SIP INVITE, to the VCC SIP server 106 to establish a session between the enterprise PBX 102 and the VCC SIP server 106. This redirects the call to the VCC SIP server 106 via the enterprise PBX 102. In step 206, the VCC SIP server 106 responds to the INVITE with a message such as a 100 TRY. The message (e.g., the 100 TRY) of step 206 may serve as a response to the INVITE message of step 204 while indicating that some time may be needed to respond to the INVITE message with an actual acceptance or rejection.

In step 208, the VCC SIP server 106 contacts the VCC policy server 110 to see if the VCC client 126 is allowed access to the requested VCC functionality. For example, the policy may identify that the VCC client 126 may perform certain functions within the enterprise network 100 but VCC functionality is not authorized. Alternatively, the policy may indicate that VCC functionality is authorized for the VCC client 126. It is understood that the policy may be used to allow some or all functionality as desired for a particular VCC client. Accordingly, while many VCC clients may call the pilot number, the handling of the VCC clients within the enterprise network 100 may differ based on the policy associated with a particular VCC client.

Although not shown in FIG. 2, the VCC SIP server 106 may need caller identification (ID) information (e.g., subscriber identity module (SIM) information, authentication credentials, and/or other ID information) corresponding to the VCC client 126 to present to the policy server 110. However, because the enterprise network 100 cannot usually access operator information within the external network 112 or 116, the enterprise network 100 may not have access to subscriber information corresponding to the VCC client 126 in the same way that a network operator of the external network 112 or 116 would have such information to allow the VCC client 126 to log into the external network.

Accordingly, for an outbound call when the VCC client 126 is in the cellular network, the enterprise PBX 102 may obtain the caller ID information from the VCC client 126 and pass it to the SIP server 106. If the caller ID information is not available to the enterprise PBX 102 from the VCC client 126, the VCC SIP server 106 may reject the call and the enterprise PBX 102 may then take steps as defined by its configuration (e.g., reject the call, continue the call without VCC functionality, or perform other functions). Alternatively, if the caller ID information is not available from the VCC client 126, the VCC SIP server 106 may connect the call and request that the VCC client 126 supply the needed caller ID information. The VCC client 126 may supply the caller ID information via dual-tone multi-frequency (DTMF) signaling, such as that described below with respect to step 230, or by other means. In the present example, once the call is connected in the enterprise network 100, the only way to communicate with the VCC client 126 is through DTMF signaling. For an outbound call in embodiments where the VCC client 126 is in the IP network, the caller ID information may be sent via SIP signaling during call setup or prior to call setup during registration. For embodiments having inbound calls, the enterprise network 100 may receive identification information for the VCC client 126 from the E.164 device 128 and the enterprise network 100 may obtain additional information from the VCC client 126.

Steps 210, 212, and 214 represent a message sequence that may occur when the policy on the policy server 110 indicates that the VCC client 126 does not have access to the requested VCC functionality. Steps 216 and following represent a message sequence that may occur when the policy indicates that the VCC client 126 does have access to the requested VCC functionality. It is understood that only one of the messages sequences 210, 212, 214 or 216 and following will generally be executed.

In step 210, if the requested VCC functionality is not allowed for the VCC client 126, the VCC policy server 110 sends a message to the VCC SIP server 106 indicating that access to the VCC functionality is denied for the VCC client 126. In step 212, in response to the message of step 210, the VCC SIP server 106 sends a 404 Not Found or another message indicating failure to the enterprise PBX 102. In step 214, the enterprise PBX 102 notifies the VCC client 126 that the call is terminated. If the call is terminated, the message sequence 200 ends at this point.

Alternatively, in step 216, if the requested VCC functionality is allowed for the VCC client 126, the VCC policy server 110 sends a message to the VCC SIP server 106 that access to the VCC functionality is allowed for the VCC client 126. In step 218, the VCC SIP server 106 sends a message to the VCC media gateway 108 instructing the VCC media gateway 108 to allocate resources for the call (e.g., set up ports and perform any other needed actions). In step 220, the VCC media gateway 108 sends a message to the VCC SIP server 106 confirming the resource allocation and informing the VCC SIP server 106 of any needed information (e.g., port and address information). In step 222, after receiving confirmation from the VCC media gateway 108, the VCC SIP server 106 sends a 200 OK or another message indicating success to the enterprise PBX 102. In step 224, the enterprise PBX 102 notifies the VCC client 126 that the call is connected. This message may contain information needed for further call setup by the VCC client 126, such as information corresponding to the enterprise IP-PSTN media gateway 104 for a media leg of the call.

In step 226, the VCC client 126 and the enterprise IP-PSTN media gateway 104 establish a connection (e.g., a primary audio path) for digit collection purposes. In step 228, the enterprise IP-PSTN media gateway 104 and the VCC media gateway 108 also establish a connection (i.e., a primary audio path) for digit collection. The paths created in steps 226 and 228 form a media call leg that is anchored on the VCC media gateway 108.

In step 230, the VCC client 126 sends digits corresponding to the actual destination number to be dialed (e.g., the telephone number of the E.164 device 128) to the VCC media gateway 108 via the enterprise IP-PSTN media gateway 104. The digits may be in the form of DTMF signaling or may be any other type of signaling desired and may be dialed automatically or manually. For example, a software application running on the VCC client 126 may automatically send the digits when it receives a connected message or otherwise determines that they are needed or the VCC client 126 may prompt the user to enter the digits manually.

In step 232, the VCC media gateway 108 notifies the VCC SIP server 106 that the digits have been collected from the VCC client 126. In step 234, the VCC SIP server 106 sends an INVITE HOLD CALL message to the enterprise PBX 102. In step 236, the enterprise PBX 102 sends a message to the enterprise IP-PSTN media gateway 104 to hold the call. In step 238, the enterprise IP-PSTN media gateway 104 sends a message to the VCC client 126 that the cellular call is on media hold. These holds provide an opportunity for the enterprise network 100 to establish a connection with the destination E.164 device 128. It is understood that this hold signaling may not occur or may be accomplished in a different manner in some embodiments.

Accordingly, in step 240, VCC SIP server 106 sends a message to the enterprise PBX 102 to invite the E.164 device 128 (i.e., the telephone number represented by the collected digits) to the call. In step 242, the enterprise PBX 102 sends a call invitation to the E.164 device 128. The call invitation is a request that the actual destination number obtained from the collected digits join the call. In step 244, the E.164 device 128 accepts the call in a response to the enterprise PBX 102. It is understood that if the E.164 device 128 rejects the call, step 244 would indicate the rejection. The rejection would then be passed to the VCC client 126 and the call would be terminated. In step 246, the enterprise PBX 102 sends a 200 OK to the VCC SIP server 106. If the call was rejected by the E.164 device 128, this message would indicate the rejection.

In step 248, an audio path is established between the enterprise IP-PSTN media gateway 104 and the E.164 device 128. In step 250, the VCC SIP server 106 sends a message to the enterprise PBX 102 to remove the media hold (e.g., to stop holding the call). In step 252, the PBX 102 sends a stop hold message to the enterprise IP-PSTN media gateway 104 and, in step 254, the enterprise IP-PSTN media gateway 104 sends a message to the VCC client 126 to release the media hold. In step 256, an audio path is established between the enterprise PBX 102 and the VCC media gateway 108. This path is anchored on the VCC media gateway 108. The paths of steps 248 and 256 form a media leg between the E.164 device 128 and the VCC media gateway 108.

In step 258, an audio path is established between the VCC client 126 and the enterprise IP-PSTN media gateway 104. In step 260, an audio path is established between the enterprise IP-PSTN media gateway 104 and the VCC media gateway 108. The paths of steps 258 and 260 form a media leg between the VCC client 126 and the VCC media gateway 108.

As represented by arrow 262, an audio path now exists between the VCC client 126 and the E.164 device 128. The overall audio path flows from the VCC client 126 (coupled via the cell network 112) to the enterprise IP-PSTN media gateway 104 to the VCC media gateway 108 to the enterprise IP-PSTN media gateway 104 to the E.164 device 128 (coupled via the PSTN 114).

Accordingly, the VCC client 126 (located in the cellular network 112) can place an outbound call via the enterprise network 110 to the E.164 device 128 by dialing the pilot number. Configuration of the enterprise PBX 102 enables the pilot number to be handled as an outbound number and the enterprise network 100 will handle call setup without involving an operator of either the cellular network 112 or the PSTN 114. The sequence diagram described in FIG. 2 is carrier neutral in that the enterprise network 100 is not concerned with the operator (i.e., the particular carrier) associated with the cellular network 112, the PSTN 114, or the IP network 116. As the call signaling and media paths are handled by the enterprise network 100, the enterprise network 100 has control over the call and the carrier is only used to provide the call legs to and from the enterprise network 100. Although described as an audio path, it is understood that the path between the VCC client 126 and the E.164 endpoint 128 may be any type of media path and may carry audio, video, and/or data.

Figure 3:
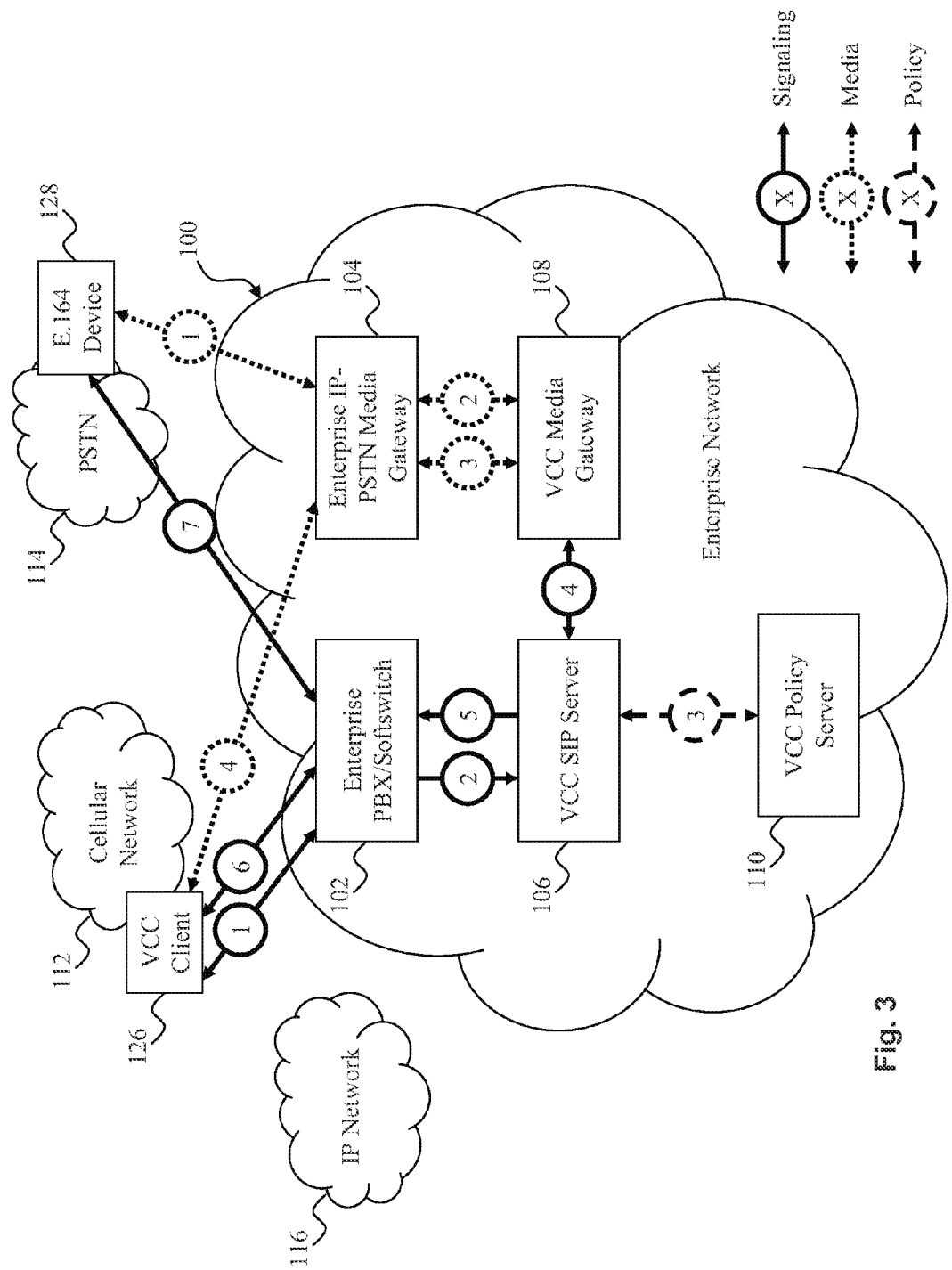
FIG. 3 is a diagram illustrating one embodiment of a message flow in the enterprise network of FIG. 1 for at least a portion of the sequence of messages of FIG. 2.

Referring to FIG. 3, a system diagram illustrates one embodiment of the basic sequence steps of FIG. 2 in the enterprise network 100 of FIG. 1. The steps of FIG. 3 are divided into signaling flow steps (represented by solid lines and numbers in solid circles) and media flow steps (represented by dotted lines and numbers in dotted circles). In the following description, the signaling and media flows will be referred to as "step X-S" and "step X-M," respectively, where X is the step number of that particular flow. Although policy flow steps are represented by dashed lines and numbers in dashed circles, they are treated as signaling steps in the following description. It is understood that the steps illustrated in FIG. 3 are simplified steps that show the basic flow of the message sequence 200 of FIG. 2 and that not all steps described with respect to FIG. 2 may be shown in FIG. 3.

In step 1-S, the VCC client 126 contacts the enterprise PBX 102 via the pilot number (step 202 of FIG. 2). In step 2-S, the enterprise PBX 102 sends a message to the VCC SIP server 106 (step 204 of FIG. 2). In step 3-S, the VCC SIP server 106 communicates with the VCC policy server 110 to verify whether the VCC client 126 is permitted to use the requested VCC functionality (steps 208 and 210/216 of FIG. 2).

In step 4-S, the VCC SIP server 106 and the VCC media gateway 108 communicate to set up the ports and perform other needed preparations for the call (steps 218 and 220 of FIG. 2). In step 5-S, the VCC SIP server 106 sends a call connected message to the enterprise PBX 102 and the enterprise PBX 102 passes this information to the VCC client 126 in step 6-S (steps 222 and 224 of FIG. 2). In step 7-S, the enterprise PBX 102 communicates with the E.164 device 128

(steps 242 and 244 of FIG. 2). Although further signaling occurs as described with respect to FIG. 2 (e.g., messages placing and removing the media hold), it is not shown here for purposes of clarity.

In step 1-M, the audio path between the enterprise IP-PSTN media gateway 104 and the E.164 device 128 is established (step 248 of FIG. 2). In step 2-M, the audio path between the enterprise IP-PSTN media gateway 104 and the VCC media gateway 108 is established (step 256 of FIG. 2). In steps 3-M and 4-M, the audio path is established between the VCC client 126 and the enterprise IP-PSTN media gateway 104 and between the enterprise IP-PSTN media gateway 104 and the VCC media gateway 108 (steps 258 and 260 of FIG. 2).

Figure 4:
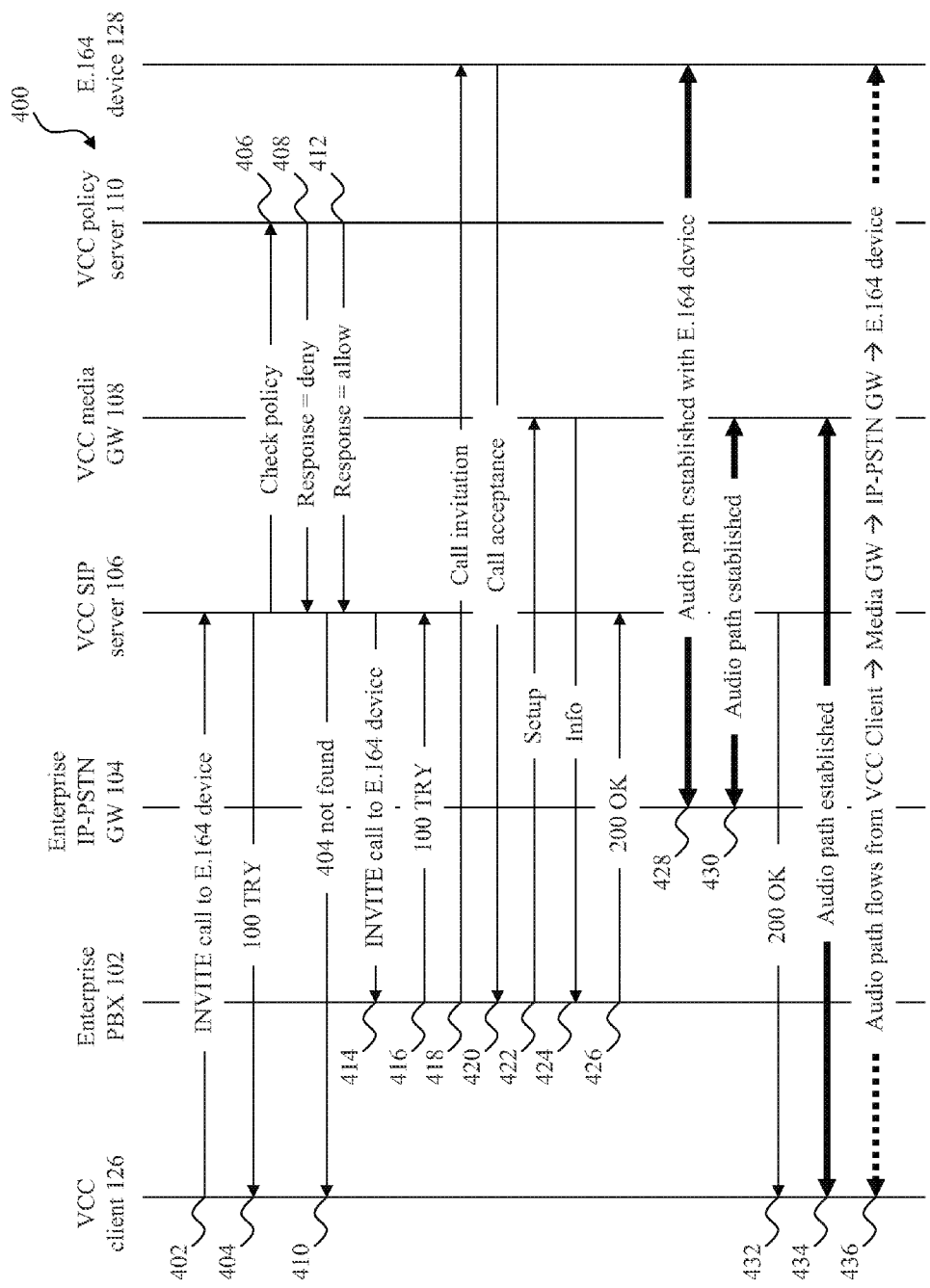
FIG. 4 is a sequence diagram illustrating one embodiment of a sequence of messages that may be used to establish an outbound Internet Protocol (IP) call between a client of the enterprise network of FIG. 1 and an external device.

Referring to FIG. 4, a sequence diagram illustrates one embodiment of a message sequence 400 that may be used with the enterprise environment 100 of FIG. 1 to place a call from the VCC client 126 to the E.164 device 128. In the present example, the VCC client 126 originates the call from the IP network 116 and the call is an outbound call from the perspective of the enterprise network 100.

In step 402, the VCC client 126 sends an INVITE via the IP network 116 (e.g., using Internet Protocol (IP) based messaging) to the VCC SIP server 106. In step 404, the VCC SIP server 106 responds with a 100 TRY message. In step 406, the VCC SIP server 106 sends a message to the VCC policy server 110 to see if the VCC functionality requested by the VCC client 126 is allowed.

Steps 408 and 410 represent a message sequence that may occur when the policy indicates that the VCC client 126 does not have access to the requested VCC functionality. Steps 412 and following represent a message sequence that may occur when the policy indicates that the VCC client 126 does have access to the requested VCC functionality. It is understood that only one of the messages sequences 408, 410 or 412 and following will generally be executed.

In step 408, if the requested VCC functionality is not allowed for the VCC client 126, the VCC policy server 110 sends a message to the VCC SIP server 106 indicating that access to the VCC functionality is denied for the VCC client 126. In step 410, in response to the message of step 408, the VCC SIP server 106 sends a 404 Not Found or another message indicating failure to the VCC client 126 and the call is terminated. If the call is terminated, the message sequence 400 ends at this point.

Alternatively, in step 412, if the requested VCC functionality is allowed for the VCC client 126, the VCC policy server 110 sends a message to the VCC SIP server 106 indicating that access to the VCC functionality is allowed for the VCC client 126. In step 414, the VCC SIP server 106 sends an INVITE message to the enterprise PBX 102 for the destination E.164 device 128. In step 416, the enterprise PBX 102 sends a 100 TRY response to the VCC SIP server 106 and, in step 418, sends a call invitation to the E.164 device 128. In the present example, in step 420, the E.164 device 128 responds by accepting the call and sending the acceptance to the enterprise PBX 102. It is understood that the E.164 device 128 may reject the call invitation, in which case the rejection would flow back to the enterprise PBX 102, from there to the VCC SIP server 106, and from the VCC SIP server 106 to the VCC client 126. The call would then be terminated.

However, as the call is accepted by the E.164 device 128 in the present example, the enterprise PBX 102 sends a setup message to the VCC media gateway 108 instructing the VCC media gateway 108 to allocate resources for the call in step 422. In step 424, the VCC media gateway 108 confirms the resource allocation and sends any needed information to the enterprise PBX 102.

In step 426, the enterprise PBX 102 sends a 200 OK message to the VCC SIP server 106 indicating that the call has been accepted. In step 428, an audio path is established between the enterprise IP-PSTN media gateway 104 and the E.164 device 128. An audio path is established between the enterprise IP-PSTN gateway 104 and the VCC media gateway 108 in step 430. The paths of steps 428 and 430 form a media leg between the E.164 device 128 and the VCC media gateway 108. In step 432, the VCC SIP server 106 sends a 200 OK message to the VCC client 126. In step 434, an audio path is established between the VCC client 126 and the VCC media gateway 108.

As represented by arrow 436, an audio path now exists between the VCC client 126 and the E.164 device 128. The overall audio path flows from the VCC client 126 to the VCC media gateway 108 to the enterprise IP-PSTN media gateway 104 to the E.164 device 128.

Accordingly, the VCC client 126 (located in the IP network 116) can place an outbound call via the enterprise network 110 to the E.164 device 128 by dialing the pilot number. Configuration of the enterprise PBX 102 enables the pilot number to be handled as an outbound number and the enterprise network 100 will handle call setup without involving an operator of either the IP network 116 or the PSTN 114. As the call signaling and media paths are handled by the enterprise network 100, the enterprise network 100 has control over the call.

Figure 5:
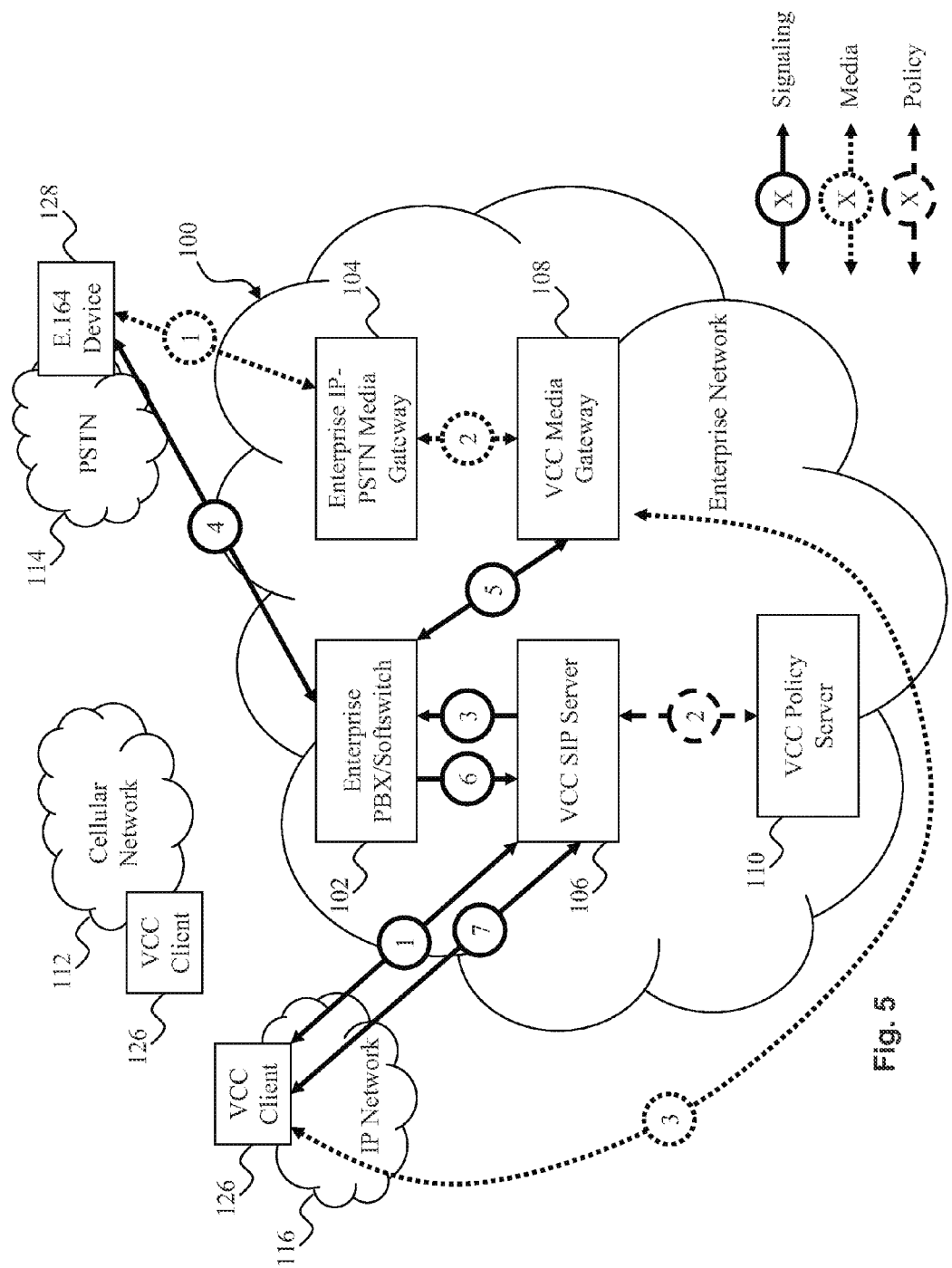
FIG. 5 is a diagram illustrating one embodiment of a message flow in the enterprise network of FIG. 1 for at least a portion of the sequence of messages of FIG. 4.

Referring to FIG. 5, a system diagram illustrates one embodiment of the basic sequence steps of FIG. 4 in the enterprise network 100 of FIG. 1. The steps of FIG. 5 are divided into signaling flow steps (represented by solid lines and numbers in solid circles) and media flow steps (represented by dotted lines and numbers in dotted circles). In the following description, the signaling and media flows will be referred to as "step X-S" and "step X-M," respectively, where X is the step number of that particular flow. Although policy flow steps are represented by dashed lines and numbers in dashed circles, they are treated as signaling steps in the following description. It is understood that the steps illustrated in FIG. 5 are simplified steps that show the basic flow of the message sequence 400 of FIG. 4 and that not all steps described with respect to FIG. 4 may be shown in FIG. 5.

In step 1-S, the VCC client 126 sends an INVITE message to the VCC SIP server 106 (step 402 of FIG. 4). In step 2-S, the VCC SIP server 106 communicates with the VCC policy server 110 to verify whether the VCC client 126 is permitted to use the requested VCC functionality (steps 406 and 408/412 of FIG. 4).

In step 3-S, the VCC SIP server 106 sends an INVITE to the enterprise PBX 102 (step 414 of FIG. 4). In step 4-S, the enterprise PBX 102 communicates with the E.164 device 128 for call invitation and acceptance (steps 418 and 420 of FIG. 4). In step 5-S, the enterprise PBX 102 communicates with the VCC media gateway 108 to allocate resources for the call (steps 422 and 424 of FIG. 4). In step 6-S, the enterprise PBX 102 sends a 200 OK message to the VCC SIP server 106 (step 426 of FIG. 4). In step 7-S, the VCC SIP server 106 sends a 200 OK message to the VCC client 126 (step 432 of FIG. 4).

In step 1-M, an audio path is established between the enterprise IP-PSTN media gateway 104 and the E.164 device 128 (step 428 of FIG. 4). In step 2-M, an audio path is established between the enterprise IP-PSTN media gateway 104 and the VCC media gateway 108 (step 430 of FIG. 4). In step 3-M, an audio path is established between the VCC client 126 and the VCC media gateway 108 (step 434 of FIG. 4).

Figure 6:
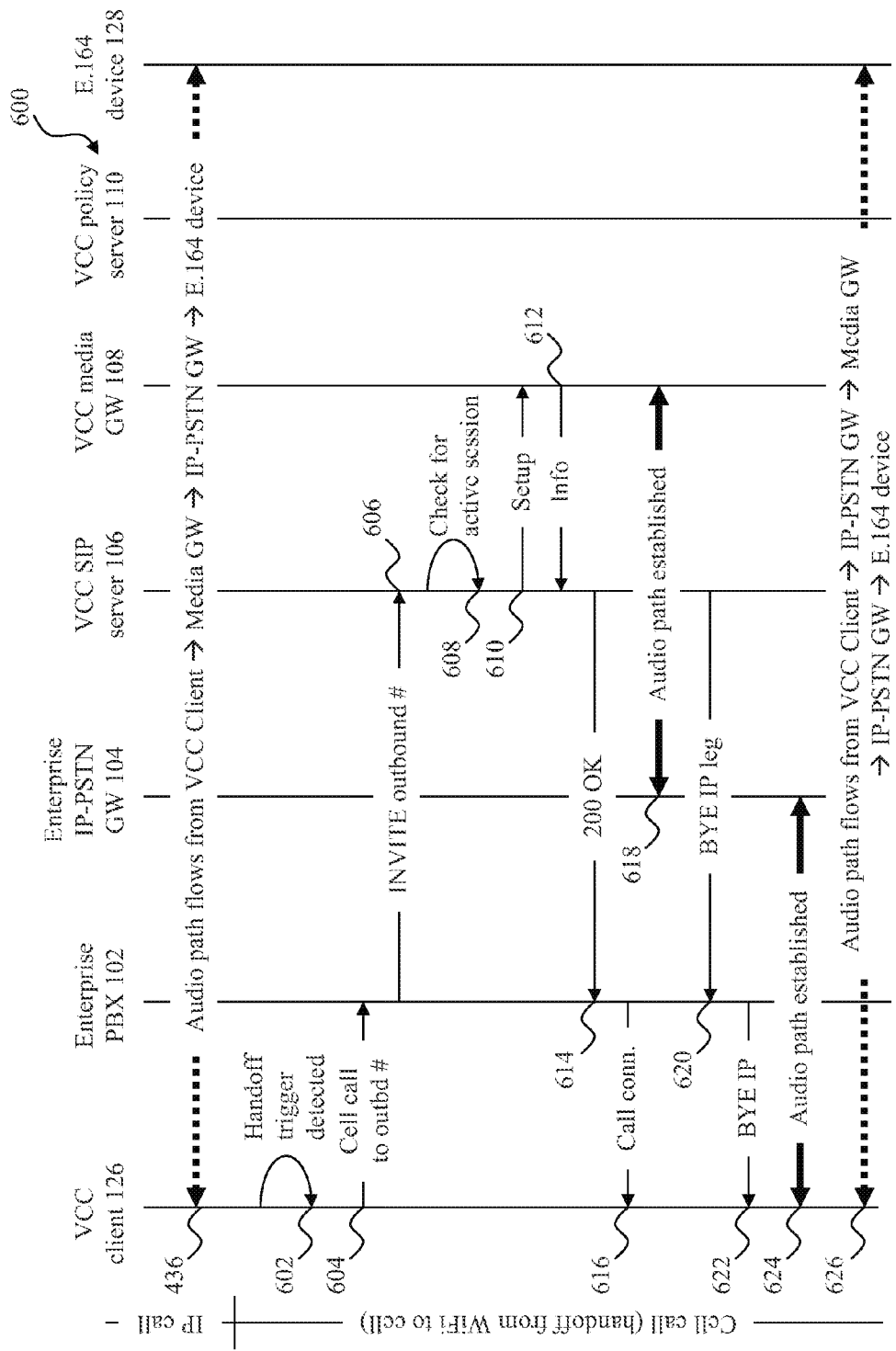
FIG. 6 is a sequence diagram illustrating one embodiment of a sequence of messages that may be used to transition a client of the enterprise network of FIG. 1 from the IP call of FIG. 4 to a cellular call.

Referring to FIG. 6, a sequence diagram illustrates one embodiment of a message sequence 600 that may be used with the enterprise environment 100 of FIG. 1 to transition a call session from a WiFi-based call to a cellular-based call. For example, if the VCC client 126 is engaged in a call using the IP network 116 and remains in the IP network 116 for the duration of the call, the call described with respect to FIG. 4 may continue to use the established audio path for the duration of the call. However, in the present embodiment, the VCC client 126 may transition from the IP network 116 to the cellular network 112 during the call, and so the audio path needs to follow this transition to provide continuity. Accordingly, at the beginning of the present example, the VCC client 126 is engaged in a call with the E.164 device 128 using the audio path represented by the arrow 436 of FIG. 4.

In step 602, the VCC client 126 detects that a trigger event has occurred. The need for a transition may be triggered by any one or more defined trigger events, such as signal loss (e.g., the WiFi signal may drop below a defined threshold), detection of a relatively stronger cellular signal, manual actuation by a user, and/or any other desired trigger event. It is understood that, in some embodiments, components of the IP network 116, the cellular network 112, and/or the enterprise network 100 may also be involved in determining whether a trigger event has occurred.

In step 604, the VCC client 126 places a cellular call to the pilot number associated with the enterprise PBX 102. In some embodiments, if the VCC client 126 is capable of maintaining both the WiFi connection and a cellular connection, the VCC client 126 may place the cellular call prior to the loss of the WiFi connection. For example, the VCC client 126 may detect that the WiFi signal is weakening in step 602, and may then initiate step 604 before losing the WiFi connection.

In step 606, the enterprise PBX 102 sends an INVITE message to the VCC SIP server 106. In step 608, the VCC SIP server 106 determines whether there is an active session for the current call. In the present example, the VCC SIP server 106 identifies the active cellular session between the VCC client 126 and the E.164 device 128. Accordingly, in step 610, the VCC SIP server 106 sends a message to the VCC media gateway 108 to allocate resources for the call or to modify existing resources to handle the transition. In step 612, the VCC media gateway 108 responds to the VCC SIP server 106 and sends the VCC SIP server 106 any needed information.

In step 614, the VCC SIP server 106 sends a 200 OK to the enterprise PBX 102. It is understood that, if the VCC SIP server 106 does not find an active session in step 608, the message sequence may revert to messages required to set up a call as described with respect to FIG. 2. For example, upon failing to find an active session, the VCC SIP server 106 may move to step 208 of FIG. 2 to perform call setup functions needed to establish a call with the E.164 device 128.

In step 616, the enterprise PBX 102 sends a message to the VCC client 126 indicating that the call has been connected. In step 618, an audio path is established between the enterprise IP-PSTN media gateway 104 and VCC media gateway 108. In step 620, the VCC SIP server 106 sends a BYE message to the enterprise PBX 102 indicating that the IP leg between the VCC client 126 and the VCC media gateway 108 is to be dropped. In step 622, the enterprise PBX 102 sends a BYE message to the VCC client 126 to drop the IP leg.

In step 624, an audio path is established between the VCC client 126 and the enterprise IP-PSTN media gateway 104. This audio path couples the VCC client 126 to the VCC media gateway 108 via the audio path established in step 618. As indicated by arrow 626, the overall audio path flows from the VCC client 126 to the enterprise IP-PSTN media gateway 104 to the VCC media gateway 108 to the enterprise IP-PSTN media gateway 104 to the E.164 device 128. Accordingly, the original leg between the enterprise network 100 and the E.164 device 128 as established in steps 428 and 430 of FIG. 4 is maintained and a new cellular leg replaces the IP leg that previously existed between the VCC client 126 and the enterprise network 100.

Figure 7:
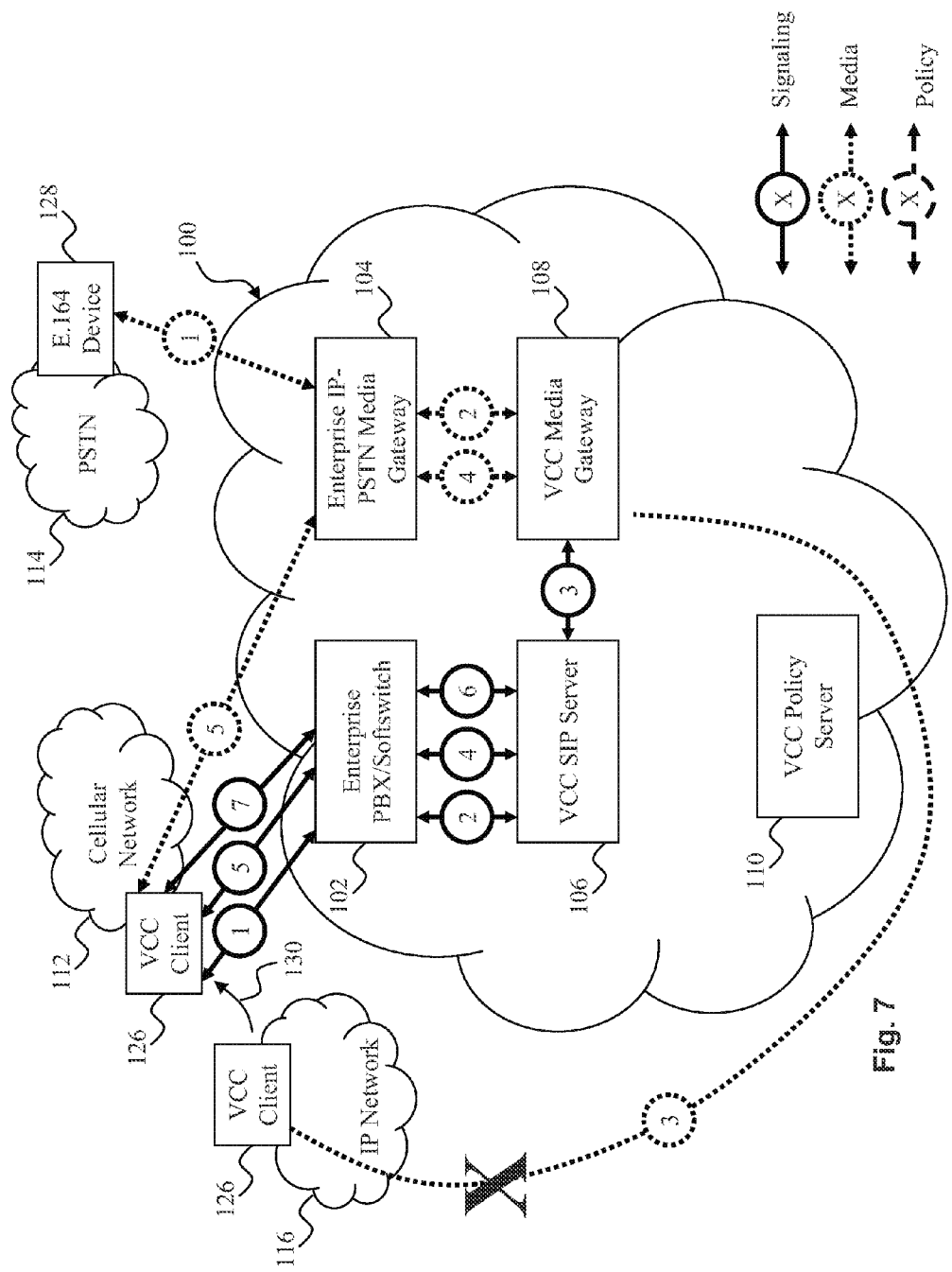
FIG. 7 is a diagram illustrating one embodiment of a message flow in the enterprise network of FIG. 1 for at least a portion of the sequence of messages of FIG. 6.

Referring to FIG. 7, a system diagram illustrates one embodiment of the basic sequence steps of FIG. 6 in the enterprise network 100 of FIG. 1. The steps of FIG. 7 are divided into signaling flow steps (represented by solid lines and numbers in solid circles) and media flow steps (represented by dotted lines and numbers in dotted circles). In the following description, the signaling and media flows will be referred to as "step X-S" and "step X-M," respectively, where X is the step number of that particular flow. Although policy flow steps are represented by dashed lines and numbers in dashed circles, they are treated as signaling steps in the following description. It is understood that the steps illustrated in FIG. 7 are simplified steps that show the basic flow of the message sequence 600 of FIG. 6 and that not all steps described with respect to FIG. 6 may be shown in FIG. 7.

In step 1-S, the VCC client 126 places a call to the pilot number on the enterprise PBX 102 (step 604 of FIG. 6). In step 2-S, the enterprise PBX 102 sends an INVITE message to the VCC SIP server 106 (step 606 of FIG. 6). In step 3-S, the VCC SIP server 106 communicates with the VCC media gateway 108 to allocate and/or modify resources for the call (steps 610 and 612 of FIG. 6). In step 4-S, the VCC SIP server 106 sends a 200 OK message to the enterprise PBX 102 (step 614 of FIG. 6). In step 5-S, the enterprise PBX 102 sends a message to the VCC client 126 that the cellular call is connected (step 616 of FIG. 6). In step 6-S, the VCC SIP server 106 sends a BYE message to the enterprise PBX 102 to end the IP leg of the call (step 620 of FIG. 6). In step 7-S, the enterprise PBX sends the BYE SIP message to the VCC client 126 (step 622 of FIG. 6).

Steps 1-M, 2-M, and 3-M are described with respect to FIG. 5 and are the existing audio paths represented by arrow 436 of FIG. 4. In step 4-M, an audio path is established between the enterprise IP-PSTN media gateway 104 and the VCC media gateway 108 (step 618 of FIG. 6). In step 5-M, an audio path is established between the VCC client 126 and the enterprise IP-PSTN media gateway 104 (step 624 of FIG. 6). The audio path of step 3-M is terminated (steps 620 and 622 of FIG. 6).

Figure 8:
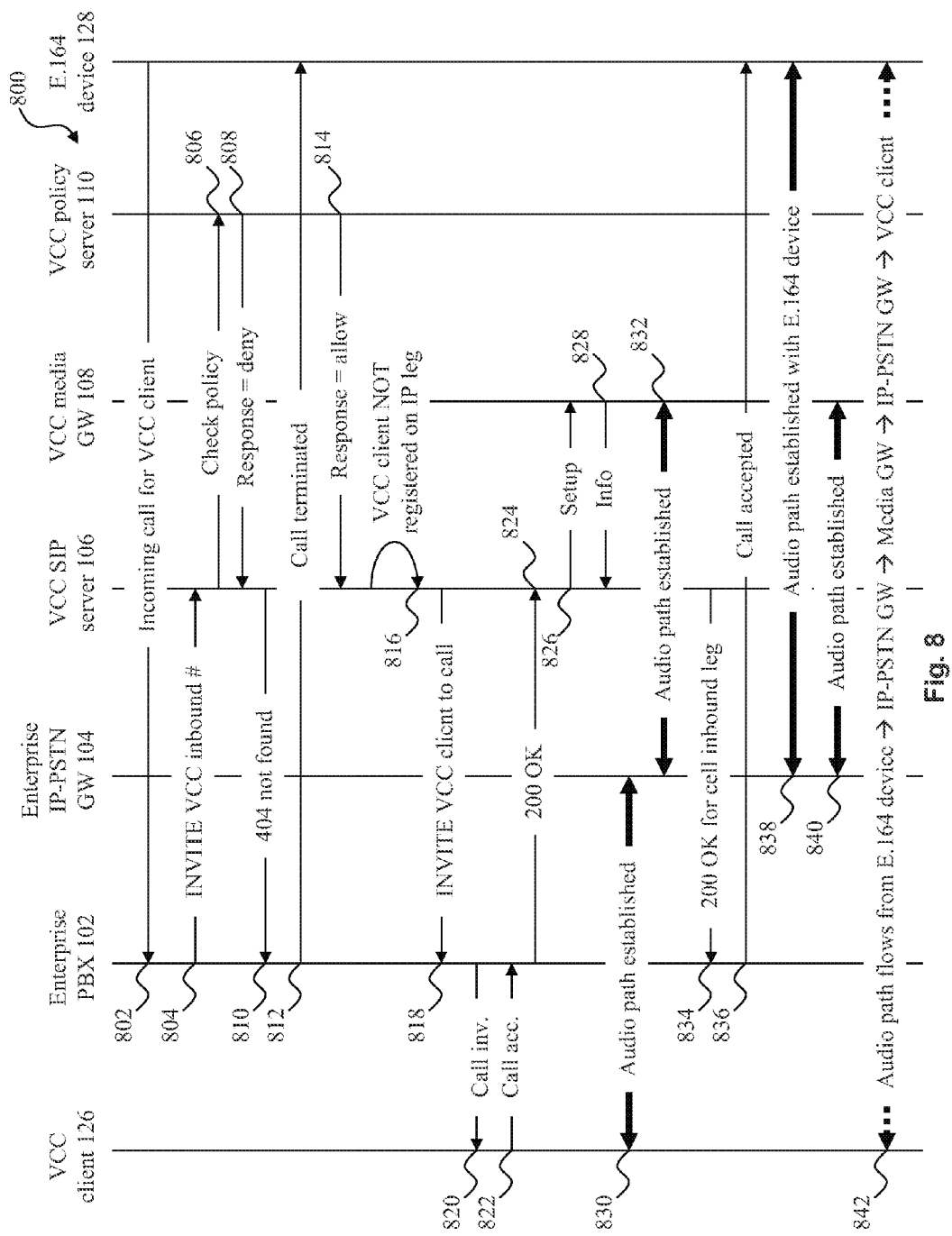
FIG. 8 is a sequence diagram illustrating one embodiment of a sequence of messages that may be used to establish an inbound cellular call between a client of the enterprise network of FIG. 1 and an external device.

Referring to FIG. 8, a sequence diagram illustrates one embodiment of a message sequence 800 that may be used with the enterprise environment 100 of FIG. 1 for a call incoming from the E.164 device 128 to the VCC client 126. In the present example, the VCC client 126 receives the call and the call is an inbound call from the perspective of the enterprise network 100.

In step 802, the enterprise PBX 102 receives an incoming call from the E.164 device 128. The call identifies the destination as the VCC client 126. The call may be received via a particular number (e.g., an inbound pilot number) or may be received on one of many available numbers on the enterprise PBX 102. In some embodiments, the enterprise PBX 102 may be configured to receive a call dialed to the number of the VCC client 126 and may initiate the needed functions to connect the incoming call to the VCC client 126.

Accordingly, in step 804, the enterprise PBX 102 sends an INVITE to the VCC SIP server 106 to redirect the call to the VCC SIP server 106. In step 806, the VCC SIP server 106 contacts the VCC policy server 110 to see if the VCC client 126 (e.g., the client associated with the incoming call request) is allowed access to the requested VCC functionality.

Steps 808, 810, and 812 represent a message sequence that may occur when the policy indicates that the VCC client 126 does not have access to the requested VCC functionality. Steps 814 and following represent a message sequence that may occur when the policy indicates that the VCC client 126 does have access to the requested VCC functionality. It is understood that only one of the messages sequences 808, 810, 812 or 814 and following will generally be executed.

In step 808, if the requested VCC functionality is not allowed for the VCC client 126, the VCC policy server 110 sends a message to the VCC SIP server 106 indicating that access to the VCC functionality is denied for the VCC client 126. In step 810, in response to the message of step 808, the VCC SIP server 106 sends a 404 Not Found or another message indicating failure to the enterprise PBX 102. In step 812, the enterprise PBX 102 sends a message to the E.164 device 128 indicating that the call is terminated. If the call is terminated, the message sequence 800 ends at this point.

Alternatively, in step 814, if the requested VCC functionality is allowed for the VCC client 126, the VCC policy server 110 sends a message to the VCC SIP server 106 indicating that access to the VCC functionality is allowed for the VCC client 126. In step 816, the VCC SIP server 106 determines whether the VCC client 126 is registered on an IP leg (e.g., reachable via an IP connection). As is known, registration of the VCC client 126 may occur when the VCC client authenticates with the enterprise network 100 (e.g., via SIP with the VCC SIP server 106 or by some other means). As registration of a client with a network is known in the art, it is not described in detail herein. If the VCC client 126 is registered, the enterprise network 100 may attempt to connect to the VCC client 126 via the IP network 116. If the VCC client 126 is not registered, as in the present example, the VCC SIP server 106 sends an INVITE message to the enterprise PBX 102 to invite the VCC client 126 to the call via the cellular network in step 818.

In step 820, the enterprise PBX 102 sends a call invitation to the VCC client 126. In step 822, the VCC client 126 sends a message to the VCC client 126 accepting the invitation. It is understood that, if the VCC client 126 rejects the invitation instead of accepting it, the message in step 822 will indicate the rejection and this rejection will be passed back to the E.164 device 128 via the enterprise PBX 102 and the VCC SIP server 106. The call will then be terminated. In step 824, the enterprise PBX 102 sends a 200 OK message to the VCC SIP server 106 indicating the acceptance by the VCC client 126.

In step 826, the VCC SIP server 106 instructs the VCC media gateway 108 to allocate resources for the call. In step 828, the VCC media gateway 108 responds to the VCC SIP server 106 and sends the VCC SIP server 106 any needed information. In step 830, an audio path is established between the VCC client 126 and the enterprise IP-PSTN media gateway 104. In step 832, an audio path is established between the enterprise IP-PSTN media gateway 104 and the VCC media gateway 108. These two paths provide a path from the VCC client 126 to the VCC media gateway 108. In step 834, the VCC SIP server 106 sends a 200 OK message to the enterprise PBX 102 indicating that the cell leg between the enterprise network 100 and the VCC client 126 has been established.

In step 836, the enterprise PBX 102 sends a message to the E.164 device 128 that the call has been accepted by the VCC client 126. In step 838, an audio path is established between the enterprise IP-PSTN media gateway 104 and the E.164 device 128. In step 840, an audio path is established between the enterprise IP-PSTN media gateway 104 and the VCC media gateway 108. The paths created in steps 838 and 840 form a path between the E.164 device 128 and the VCC media gateway 108. As indicated by arrow 842, the overall audio path flows from the E.164 device 128 to the enterprise IP-PSTN media gateway 104 to the VCC media gateway 108 to the enterprise IP-PSTN media gateway 104 to the VCC client 126.

Figure 9:
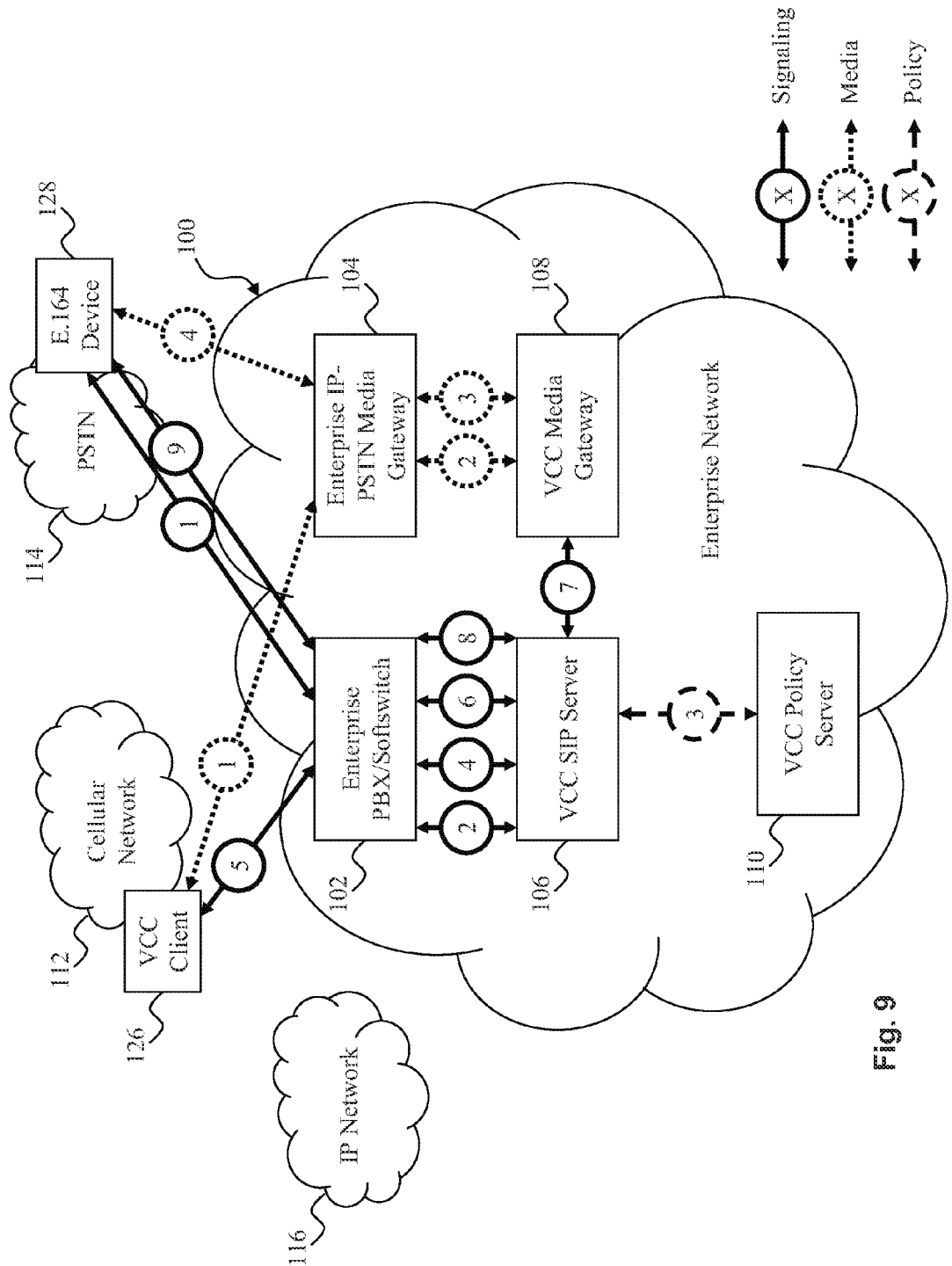
FIG. 9 is a diagram illustrating one embodiment of a message flow in the enterprise network of FIG. 1 for at least a portion of the sequence of messages of FIG. 8.

Referring to FIG. 9, a system diagram illustrates one embodiment of the basic sequence steps of FIG. 8 in the enterprise network 100 of FIG. 1. The steps of FIG. 9 are divided into signaling flow steps (represented by solid lines and numbers in solid circles) and media flow steps (represented by dotted lines and numbers in dotted circles). In the following description, the signaling and media flows will be referred to as "step X-S" and "step X-M," respectively, where X is the step number of that particular flow. Although policy flow steps are represented by dashed lines and numbers in dashed circles, they are treated as signaling steps in the following description. It is understood that the steps illustrated in FIG. 9 are simplified steps that show the basic flow of the message sequence 800 of FIG. 8 and that not all steps described with respect to FIG. 8 may be shown in FIG. 9.

In step 1-S, the E.164 device 128 places a call to the pilot number on the enterprise PBX 102 (step 802 of FIG. 8). In step 2-S, the enterprise PBX 102 sends an INVITE message to the VCC SIP server 106 (step 804 of FIG. 8). In step 3-S, the VCC SIP server 106 communicates with the VCC policy server 110 to determine whether the VCC client 126 is allowed access to the requested VCC functionality (steps 806 and 808/814 of FIG. 8). In step 4-S, the VCC SIP server 106 sends an INVITE message to the enterprise PBX 102 to invite the VCC client 126 to the call (step 818 of FIG. 8). In step 5-S, the enterprise PBX 102 communicates with the VCC client 126 and receives an acceptance (steps 820 and 822 of FIG. 8).

In step 6-S, the enterprise PBX 102 sends a 200 OK message to the VCC SIP server 106 indicating that the call has been accepted by the VCC client 126 (step 824 of FIG. 8). In step 7-S, the VCC SIP server 106 communicates with the VCC media gateway 108 to allocate resources for the call (steps 826 and 828 of FIG. 8). In step 8-S, the VCC SIP server 106 sends a 200 OK message to the enterprise PBX 102 indicating the inbound leg is ready (step 834 of FIG. 8). In step 9-S, the enterprise PBX 102 sends a message to the E.164 device 128 indicating that the call has been accepted (step 836 for FIG. 8).

In step 1-M, an audio path between the VCC client 126 and the enterprise IP-PSTN media gateway 104 is established (step 830 of FIG. 8). In step 2-M, an audio path between the enterprise IP-PSTN media gateway 104 and the VCC media gateway 108 is established (step 832 of FIG. 8). In step 3-M, an audio path between the VCC media gateway 108 and the enterprise IP-PSTN media gateway 104 is established (step 840 of FIG. 8). In step 4-M, an audio path between the enterprise IP-PSTN media gateway 104 and E.164 device 128 is established (step 838 of FIG. 8).

Figure 10:
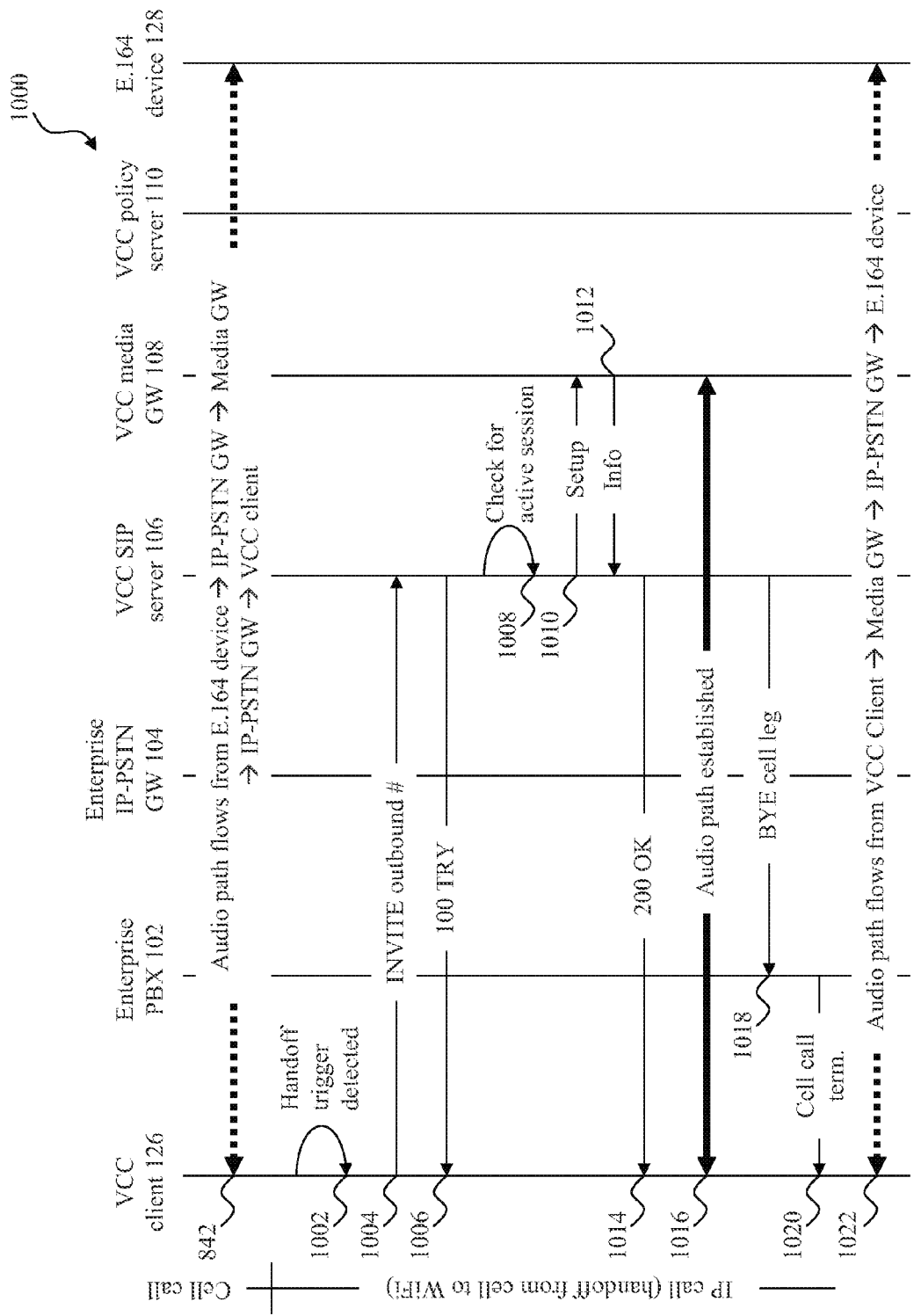
FIG. 10 is a sequence diagram illustrating one embodiment of a sequence of messages that may be used to transition a client of the enterprise network of FIG. 1 from the cellular call of FIG. 8 to an IP call.

Referring to FIG. 10, a sequence diagram illustrates one embodiment of a message sequence 1000 that may be used with the enterprise environment 100 of FIG. 1 to transition a call session from a cellular-based call to a WiFi-based call. For example, if the VCC client 126 is engaged in a call using the cellular network 112 and remains in the cellular network 112 for the duration of the call, the call described with respect to FIG. 8 may continue to use the established audio path for the duration of the call. However, in the present embodiment, the VCC client 126 may transition from the cellular network 112 to the IP network 116 during the call, and so the audio path needs follow this transition. Accordingly, at the beginning of the present example, the VCC client 126 is engaged in a cellular call with the E.164 device 128 using the audio path represented by the arrow 842 of FIG. 8.

In step 1002, VCC client 126 detects that a trigger event has occurred. The need for a transition may be triggered by any one or more defined trigger events, such as the detection of a WiFi signal of sufficient strength, signal loss of the cellular signal (e.g., the cellular signal may drop below a defined threshold), manual actuation by a user, and/or any other desired trigger event. It is understood that, in some embodiments, components of the IP network 116, the cellular network 112, and/or the enterprise network 100 may also be involved in determining whether a trigger event has occurred.

In step 1004, the VCC client 126 sends an INVITE message to the pilot number associated with the enterprise PBX 102. In some embodiments, if the VCC client 126 is capable of maintaining both the cellular connection and a WiFi connection, the VCC client 126 may send the INVITE prior to the loss of the cellular connection. For example, the VCC client 126 may detect that a WiFi signal is available in step 1002, and may then initiate step 1004 before closing the cellular connection. In step 1006, the VCC SIP server 106 sends a 100 TRY message to the VCC client 126.

In step 1008, the VCC SIP server 106 determines whether there is an active session for the VCC client 126. In the present example, the VCC SIP server 106 identifies the active cellular session between the VCC client 126 and the E.164 device 128. In step 1010, the VCC SIP server 106 instructs the VCC media gateway 108 to allocate resources for the call. In step 1012, the VCC media gateway 108 responds to the VCC SIP server 106 and sends any needed information to the VCC SIP server 106.

In step 1014, the VCC SIP server 106 sends a 200 OK to the VCC client 126. It is understood that, if the VCC SIP server 106 does not find an active session in step 1008, the message sequence may revert to messages required to set up a call as described with respect to FIG. 4. For example, upon failing to find an active session, the VCC SIP server 106 may move to step 406 of FIG. 4 to perform call setup functions needed to establish a call with the E.164 device 128. In step 1016, an audio path is established between the VCC client 126 and the VCC media gateway 108.

In step 1018, the VCC SIP server 106 sends a BYE message to the enterprise PBX 102 indicating that the cellular leg between the VCC client 126 and the enterprise network 100 is to be terminated. In step 1020, the enterprise PBX 102 sends a message to the VCC client 126 to terminate the cellular leg. Accordingly, as indicated by arrow 1022, the overall audio path flows from the VCC client 126 (via the IP network 116) to the VCC media gateway 108 to the enterprise IP-PSTN media gateway 104 to the E.164 device 128.

Figure 11:
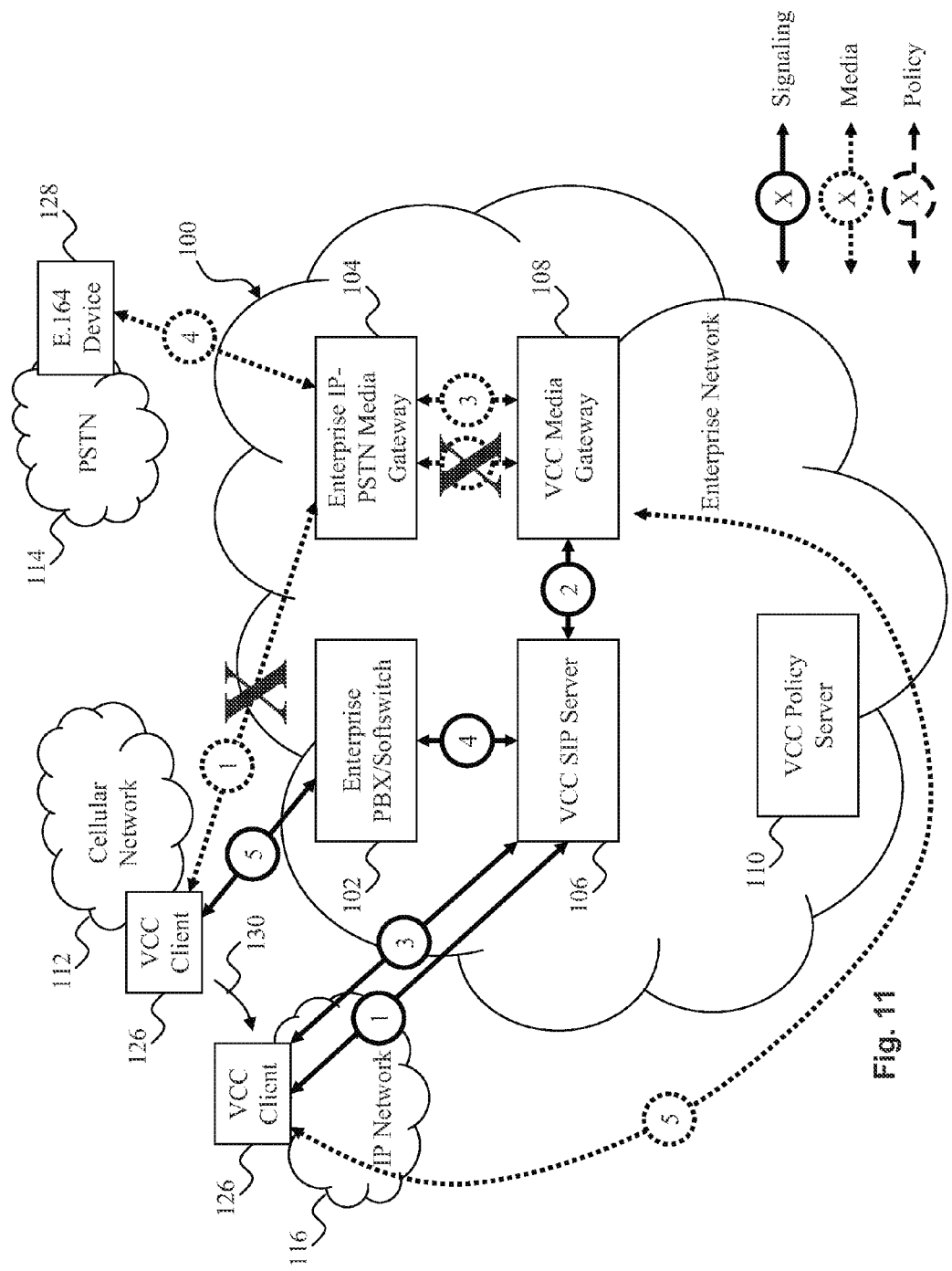
FIG. 11 is a diagram illustrating one embodiment of a message flow in the enterprise network of FIG. 1 for at least a portion of the sequence of messages of FIG. 10.

Referring to FIG. 11, a system diagram illustrates one embodiment of the basic sequence steps of FIG. 10 in the enterprise network 100 of FIG. 1. The steps of FIG. 11 are divided into signaling flow steps (represented by solid lines and numbers in solid circles) and media flow steps (represented by dotted lines and numbers in dotted circles). In the following description, the signaling and media flows will be referred to as "step X-S" and "step X-M," respectively, where X is the step number of that particular flow. Although policy flow steps are represented by dashed lines and numbers in dashed circles, they are treated as signaling steps in the following description. It is understood that the steps illustrated in FIG. 11 are simplified steps that show the basic flow of the message sequence 1000 of FIG. 10 and that not all steps described with respect to FIG. 10 may be shown in FIG. 11.

In step 1-S, the VCC client 126 sends an INVITE message to the VCC SIP server 106 (step 1004 of FIG. 10). In step 2-S, the VCC SIP server 106 communicates with the VCC media gateway 108 to allocate and/or modify resources for the call (steps 1010 and 1012 of FIG. 10). In step 3-S, the VCC SIP server 106 sends a 200 OK message to the VCC client 126 (step 1014 of FIG. 10). In step 4-S, the VCC SIP server 106 sends a BYE message to the enterprise PBX 102 to terminate the cell leg connecting the VCC client 126 with the enterprise network 100 (step 1018 of FIG. 10). In step 5-S, the enterprise PBX 102 sends the call terminated message to the VCC client 126 and the cell leg is terminated (step 1020 of FIG. 10).

Steps 1-M, 2-M, 3-M, and 4-M are described with respect to FIG. 9 and are the existing audio paths represented by arrow 842 of FIG. 8. In step 5-M, an audio path is established between the VCC client 126 and the VCC media gateway 108. In step 5-M, an audio path is established between the VCC client 126 and the VCC media gateway 108 (step 1016 of FIG. 10). The audio paths of steps 1-M and 2-M are terminated (steps 1018 and 1020 of FIG. 10).

Figure 12:
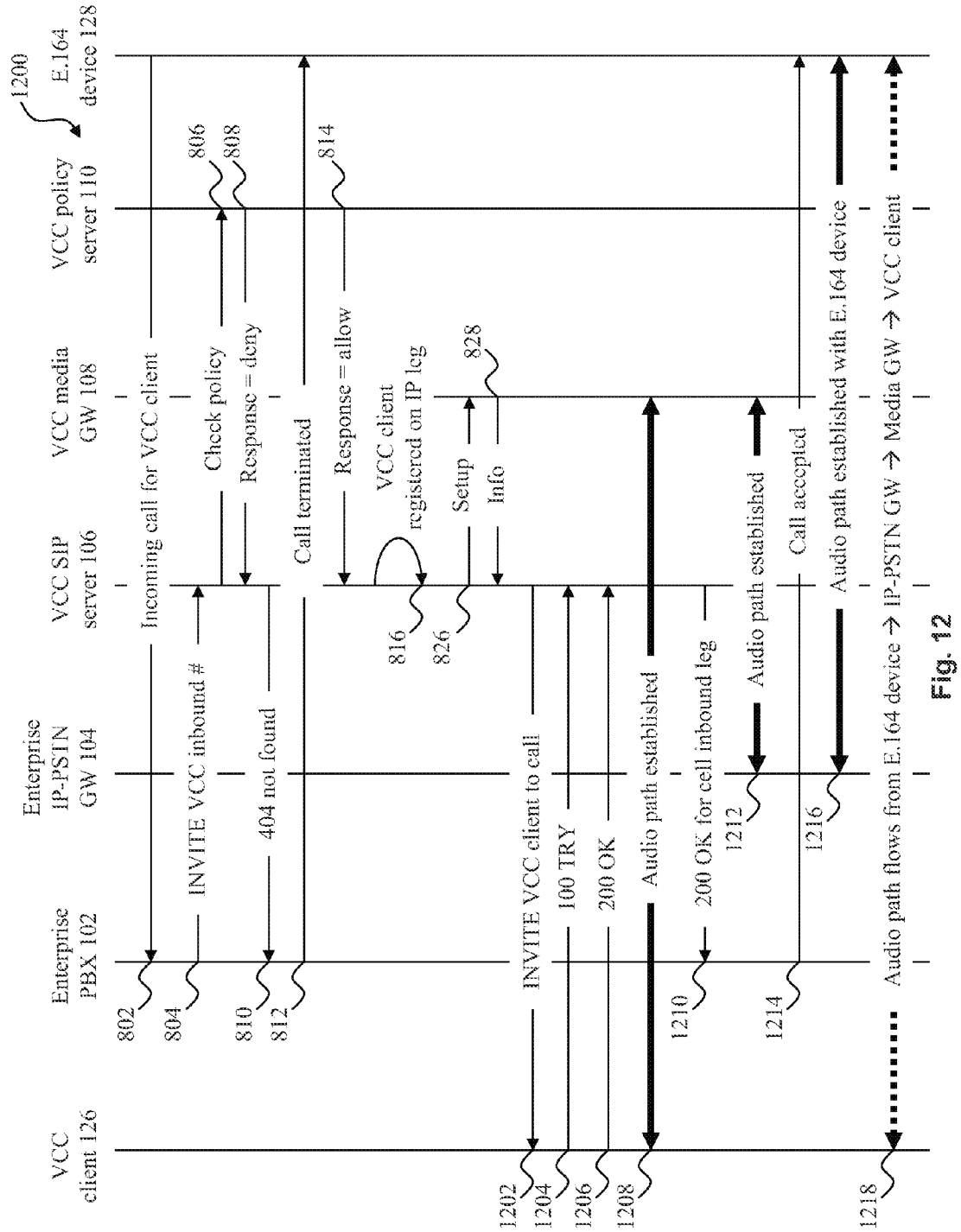
FIG. 12 is a sequence diagram illustrating one embodiment of a sequence of messages that may be used to establish an inbound IP call between a client of the enterprise network of FIG. 1 and an external device.

Referring to FIG. 12, a sequence diagram illustrates one embodiment of a message sequence 1200 that may be used with the enterprise environment 100 of FIG. 1 for a call incoming from the E.164 device 128 to the VCC client 126. In the present example, the VCC client 126 receives the call and the call is an inbound call from the perspective of the enterprise network 100.

Steps 802-816, 826, and 828 are the same as the identically numbered steps described previously with respect to FIG. 8. As such, these steps are not further described with respect to FIG. 12 except for step 816. In the present example, in step 816, the VCC SIP server 106 determines that the VCC client 126 is registered on an IP leg (e.g., is reachable via an IP connection). Accordingly, in step 1202, the VCC SIP server 106 sends an INVITE message to the VCC client 126. In step 1204, the VCC client 126 responds with a 100 TRY message and, in step 1206, accepts the call by sending a 200 OK message to the VCC SIP server 106. It is understood that, if the VCC client 126 were to reject the call, the message in step 1206 would indicate the rejection. This rejection would be passed to the enterprise PBX 102 and from there to the E.164 device 128. The call would then be terminated. However, as the call is accepted in the present example, an audio path is established between the VCC client 126 and the VCC media gateway 108 in step 1208.

In step 1210, the VCC SIP server 106 sends a 200 OK message to the enterprise PBX 102 indicating that the inbound cell leg can be established. In step 1212, an audio path is established between the enterprise IP-PSTN media gateway 104 and the VCC media gateway 108. In step 1214, the enterprise PBX 102 notifies the E.164 device 128 that the call has been accepted. In step 1216, an audio path is established between the E.164 device 128 and the enterprise IP-PSTN media gateway 104. The paths created in steps 1212 and 1216 form a path between the E.164 device 128 and the VCC media gateway 108. As indicated by arrow 1218, the overall audio path flows from the E.164 device 128 to the enterprise IP-PSTN media gateway 104 to the VCC media gateway 108 to the VCC client 126.

Figure 13:
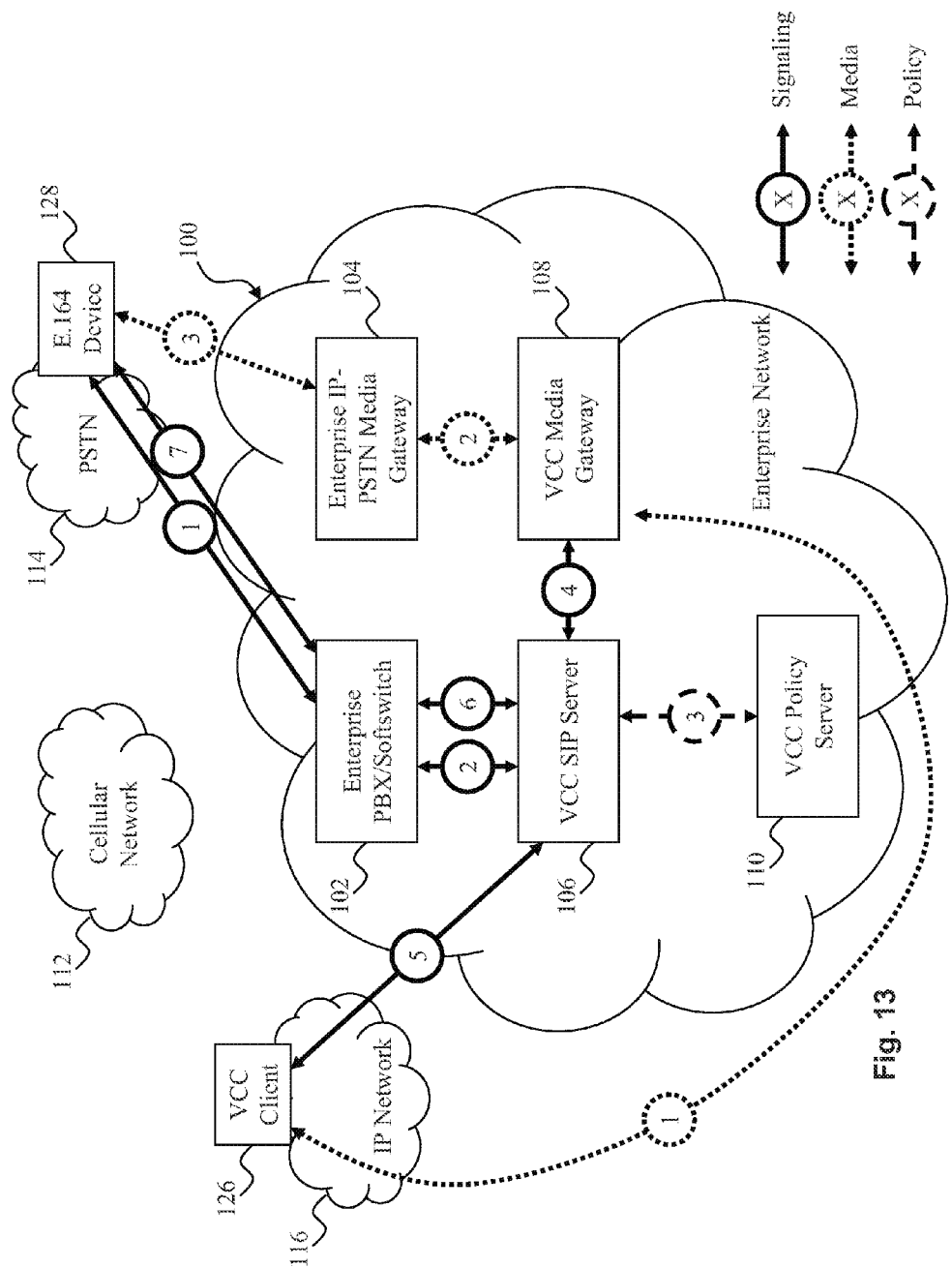
FIG. 13 is a diagram illustrating one embodiment of a message flow in the enterprise network of FIG. 1 for at least a portion of the sequence of messages of FIG. 12.

Referring to FIG. 13, a system diagram illustrates one embodiment of the basic sequence steps of FIG. 12 in the enterprise network 100 of FIG. 1. The steps of FIG. 13 are divided into signaling flow steps (represented by solid lines and numbers in solid circles) and media flow steps (represented by dotted lines and numbers in dotted circles). In the following description, the signaling and media flows will be referred to as "step X-S" and "step X-M," respectively, where X is the step number of that particular flow. Although policy flow steps are represented by dashed lines and numbers in dashed circles, they are treated as signaling steps in the following description. It is understood that the steps illustrated in FIG. 13 are simplified steps that show the basic flow of the message sequence 1200 of FIG. 12 and that not all steps described with respect to FIG. 12 may be shown in FIG. 13.

In step 1-S, the E.164 device 128 places a call to the pilot number on the enterprise PBX 102 (step 802 of FIG. 12). In step 2-S, the enterprise PBX 102 sends an INVITE message to the VCC SIP server 106 (step 804 of FIG. 12). In step 3-S, the VCC SIP server 106 communicates with the VCC policy server 110 to determine whether the VCC client 126 is allowed access to the requested VCC functionality (steps 806 and 808/814 of FIG. 12). In step 4-S, the VCC SIP server 106 communicates with the VCC media gateway 108 to allocate resources for the call (steps 826 and 828 of FIG. 12).

In step 5-S, the VCC SIP server 106 sends an INVITE message to the VCC client 126 to invite the VCC client 126 to the call and the VCC client 126 responds by accepting the call (steps 1202 and 1206 of FIG. 12). In step 6-S, the VCC SIP server 106 sends a 200 OK message to the enterprise PBX 102 indicating the inbound leg is ready (step 1210 of FIG. 12). In step 7-S, the enterprise PBX 102 sends a message to the E.164 device 128 indicating that the call has been accepted (step 1214 of FIG. 12).

In step 1-M, an audio path between the VCC client 126 and the VCC media gateway 108 is established (step 1208 of FIG. 12). In step 2-M, an audio path between the enterprise IP-PSTN media gateway 104 and the VCC media gateway 108 is established (step 1212 of FIG. 12). In step 3-M, an audio path between the E.164 device 128 and the enterprise IP-PSTN media gateway 104 is established (step 1216 of FIG. 12).

Figure 14:
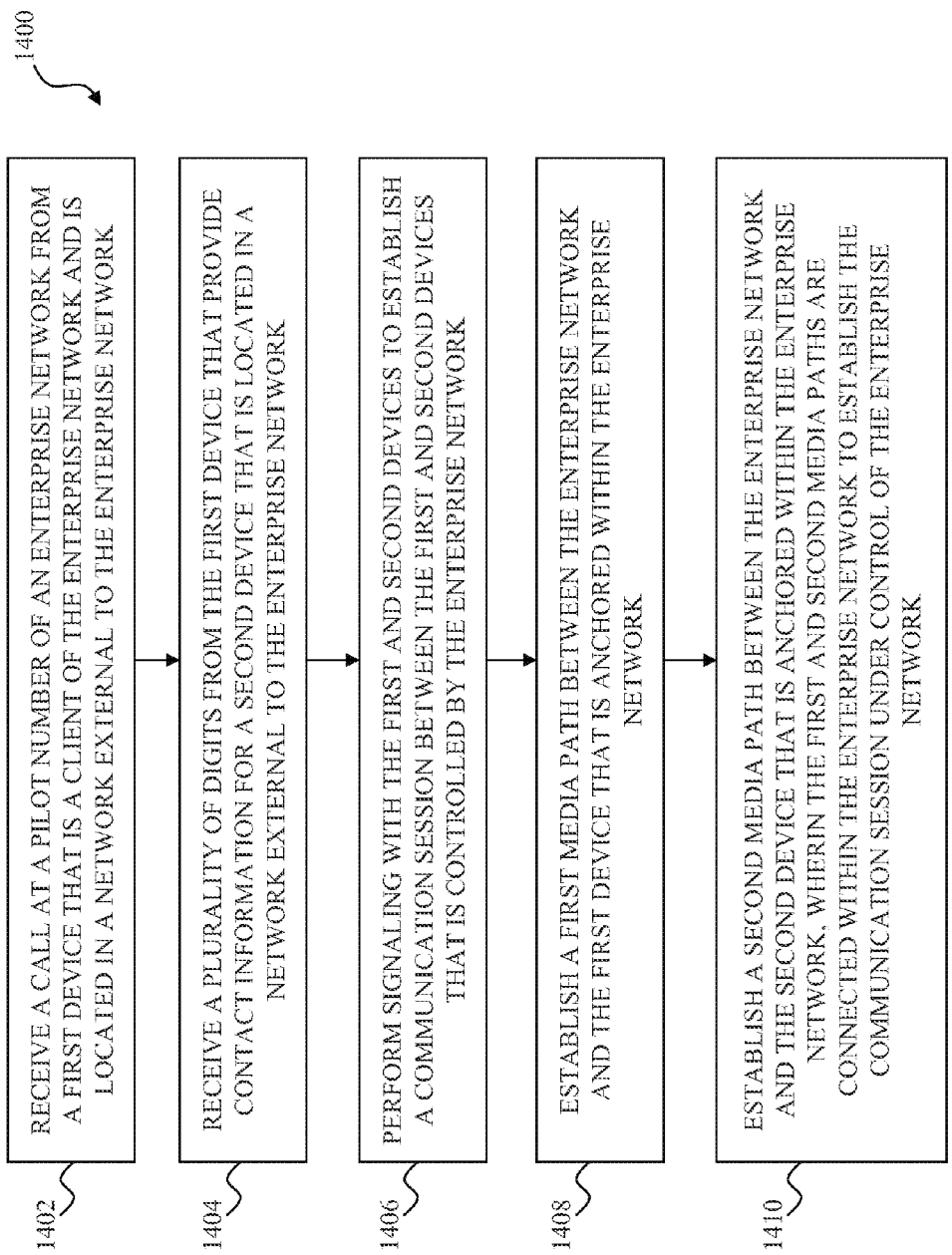
FIG. 14 is a flow chart illustrating one embodiment of a method for handling an outbound call within the enterprise network of FIG. 1.

Referring to FIG. 14, a flow chart illustrates one embodiment of a method 1400 that may be used by the enterprise network 100 of FIG. 1 to handle an outbound call by the VCC client 126. In step 1402, the enterprise network 100 receives a call at a pilot number of the enterprise network 100 from a first device (e.g., the VCC client 126). As described previously, the enterprise network 100 may designate a call received at the pilot number as a request for a VCC communication session. In the present example, the communication session is to be established with a second device (e.g., the E.164 device 128). In step 1404, the enterprise network 100 receives a plurality of digits from the VCC client 126. The plurality of digits provide contact information corresponding to the E.164 device and may be received via DTMF signaling, via SIP signaling, or by other means. In step 1406, the enterprise network 100 performs signaling with the VCC client 126 and the E.164 device 128 to establish the communication session. In step 1408, the enterprise network 100 establishes a first media path between the enterprise network 100 and the VCC client 126. The first media path is anchored on the VCC media gateway 108 within the enterprise network 100. In step 1410, the enterprise network 100 establishes a second media path between the enterprise network 100 and the E.164 device 128. The second media path is anchored on the VCC media gateway 108. The first and second media paths connect the VCC client 126 and the E.164 device 128 for the communication session.

Figure 15:
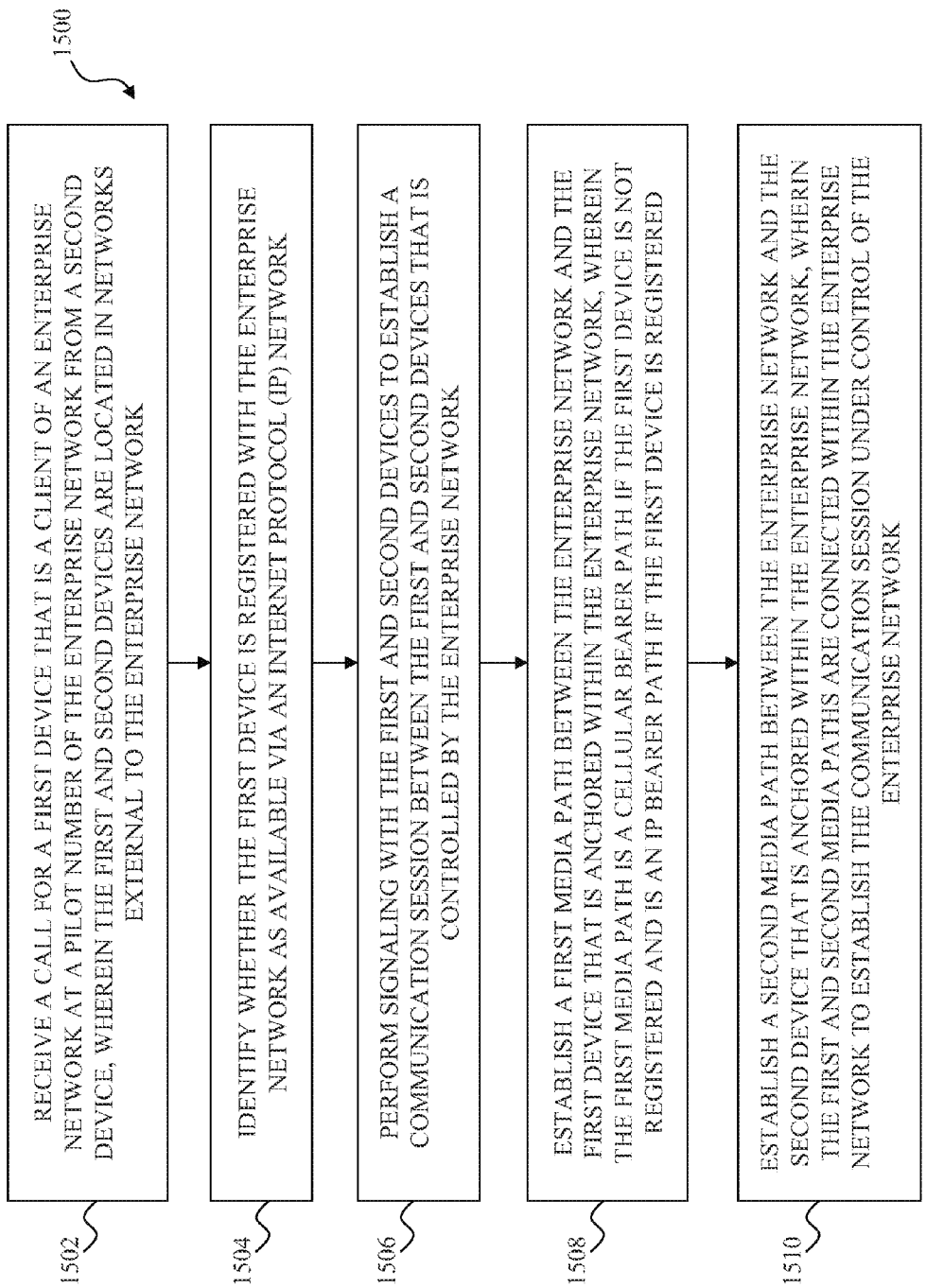
FIG. 15 is a flow chart illustrating one embodiment of a method for handling an inbound call within the enterprise network of FIG. 1.

Referring to FIG. 15, a flow chart illustrates one embodiment of a method 1500 that may be used by the enterprise network 100 of FIG. 1 to handle an inbound call by the VCC client 126. In step 1502, the enterprise network receives a call at a pilot number of the enterprise network 100 from a second device (e.g., the E.164 device 128). The enterprise network 100 designates a call received at the pilot number as a request for a VCC communication session. The call identifies a first device (e.g., the VCC client 126) as the destination. In step 1504, the enterprise network identifies whether the VCC client 126 is registered with the enterprise network 100 as available to the enterprise network 100 via an IP network. In step 1506, the enterprise network 100 performs signaling with the VCC client 126 and the E.164 device 128 to establish the communication session. In step 1508, the enterprise network 100 establishes a first media path between the enterprise network 100 and the VCC client 126. The first media path is anchored on the VCC media gateway 108. The first media path is a cellular bearer path if the VCC client 126 is not registered as available via the IP network and is an IP bearer path if the VCC client 126 is registered as available via the IP network. In step 1510, the enterprise network 100 establishes a second media path between the enterprise network 100 and the E.164 device 128. The second media path is anchored on the VCC media gateway 108. The first and second media paths connect the VCC client 126 and the E.164 device 128 for the communication session.

Figure 16:
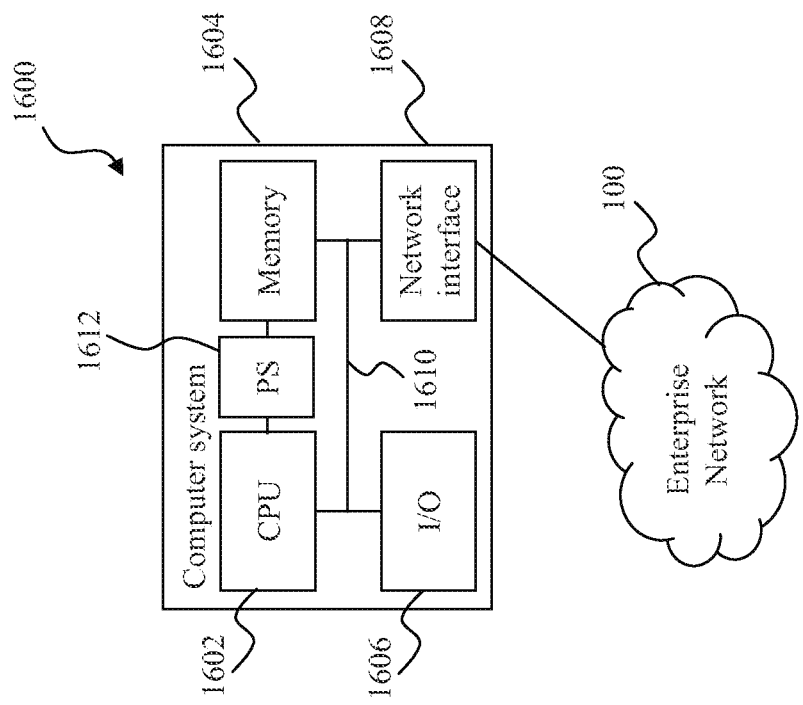
FIG. 16 is a simplified diagram of one embodiment of a computer system that may be used in embodiments of the present disclosure.

Referring to FIG. 16, one embodiment of a computer system 1600 is illustrated. The computer system 1600 is one possible example of a system component or device such as the enterprise PBX/softswitch 102, enterprise IP-PSTN media gateway 104, VCC SIP server 106, VCC media gateway 108, and/or VCC policy server 110. The computer system 1600 may include a central processing unit ("CPU") 1602, a memory unit 1604, an input/output ("I/O") device 1606, and a network interface 1608. The components 1602, 1604, 1606, and 1608 are interconnected by a transport system (e.g., a bus) 1610. A power supply (PS) 1612 may provide power to components of the computer system 1600, such as the CPU 1602 and memory unit 1604. It is understood that the computer system 1600 may be differently configured and that each of the listed components may actually represent several different components. For example, the CPU 1602 may actually represent a multi-processor or a distributed processing system; the memory unit 1604 may include different levels of cache memory, main memory, hard disks, and remote storage locations; the I/O device 1606 may include monitors, keyboards, and the like; and the network interface 1608 may include one or more network cards providing one or more wired and/or wireless connections to the enterprise network 100 (FIG. 1). Therefore, a wide range of flexibility is anticipated in the configuration of the computer system 1600.

The computer system 1600 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 1600. The operating system, as well as other instructions (e.g., for voice call continuity as described herein), may be stored in the memory unit 1604 and executed by the processor 1602. For example, if the computer system 1600 is the VCC SIP server 106, the memory unit 1604 may include instructions for sending and receiving messages, performing any needed message processing, and performing similar actions as described herein.

In the embodiments described herein, it is understood that the messages shown are for purposes of illustration only. For example, there may be many messages that are not shown in the sequence diagrams. Such messages may be commonly known for setting up call legs and/or communicating information between different components of the enterprise network 100, the VCC client 126, and/or the E.164 device 128. For example, messages may be exchanged between the VCC SIP server 106, the VCC media gateway 108, and/or the enterprise IP-PSTN media gateway 104 so that the VCC media gateway 108 and/or the enterprise IP-PSTN media gateway 104 can allocate resources for a call and convey the needed information to other components of the enterprise network 100.

Some messages, such as 100 TRY messages, may be used or omitted as desired depending on the particular implementation of the embodiments described above. Furthermore, it is understood that the term "message" as used herein may represent one or more messages and is not limited to a single message packet or datagram.

In some embodiments, various steps in the described message sequences may be performed in a different order from that shown. For example, a call leg connecting the enterprise IP-PSTN media gateway 104 and the VCC media gateway 108 and a call leg connecting the VCC media gateway 108 to the VCC client 126 and/or the E.164 device 128 may be established in a different order than shown in some embodiments. In other embodiments, messages such as 200 OK messages and 100 TRY messages may occur before or after their illustrated positions depending on, for example, the particular order in which a sequence is executed. In still other embodiments, steps may occur simultaneously as different components move forward with their processes to establish a call until they reach a point where they need to hold and wait for confirmation or other information before continuing. In yet other embodiments, combined functionality (e.g., combining the policy server 110 with the VCC SIP server 106) may result in internal processes replacing the messaging shown in the provided examples. Accordingly, it is understood that variations of the illustrated embodiments may occur based on the particular implementation of the enterprise network 100 and that such variations are within the scope of the present disclosure.

Accordingly, in one embodiment the present disclosure provides an enterprise network comprising an enterprise private branch exchange (PBX) having a pilot number associated therewith, wherein the enterprise PBX is configured to communicate signaling information with a client of the enterprise network when the client is positioned in a cellular network that is separate from the enterprise network and is outside of the enterprise network's control, and wherein the enterprise PBX is further configured to communicate signaling information with an external device coupled to a PSTN that is external to the enterprise network; an enterprise IP-Public Switched Telephone Network (PSTN) media gateway configured to provide a first media path between the client and the enterprise IP-PSTN media gateway when the client is positioned in the cellular network, and further configured to provide a second media path between the enterprise IP-PSTN media gateway and the external device; a voice call continuity (VCC) Session Initiation Protocol (SIP) server configured to communicate with the enterprise PBX in order to perform signaling functions for the client via the enterprise PBX when the client is positioned in the cellular network, and further configured to communicate signaling information directly with the client when the client is positioned in an IP network that is separate from the enterprise network and is outside of the enterprise network's control; and a VCC media gateway configured to communicate with the enterprise IP-PSTN media gateway and the VCC SIP server and to receive digits corresponding to a destination number associated with the external device from the client after the client places a call to the pilot number, further configured to anchor the first and second media paths, and further configured to provide a third media path directly to the client when the client is positioned in the IP network and to anchor the third media path. The enterprise network may further comprise a policy server coupled to the VCC SIP server and configured to allow or deny access by the client to VCC functionality when queried by the VCC SIP server. The VCC SIP server may be further configured to transition the client from the first media path to the third media path while maintaining the second media path with the external device. The VCC SIP server may be further configured to transition the client from the third media path to the first media path while maintaining the second media path with the external device. The VCC media gateway may be further configured to receive the digits from the client via dual-tone multi-frequency (DTMF) signaling if the client is positioned in the cellular network.

In another embodiment, the present disclosure provides a method for use within an enterprise network comprising: receiving, by the enterprise network, a call request at a pilot number of the enterprise network from a first device that is a client of the enterprise network, wherein the enterprise network designates a call received at the pilot number as a request for a voice call continuity (VCC) communication session, and wherein the first device is located in a first communication network that is external to the enterprise network and not controlled by the enterprise network; receiving, by the enterprise network, a plurality of digits from the first device, wherein the plurality of digits provide contact information corresponding to a second device that is located in a second communication network that is external to the enterprise network and not controlled by the enterprise network; performing, by the enterprise network, signaling with the first device and the second device to establish the communication session between the first and second devices, wherein the establishment of the communication session is controlled by the enterprise network; establishing, by the enterprise network, a first media path between the enterprise network and the first device, wherein the first media path is anchored on a media gateway within the enterprise network; and establishing, by the enterprise network, a second media path between the enterprise network and the second device, wherein the second media path is anchored on the media gateway, and wherein the first and second media paths connect the first and second devices for the communication session. In performing the signaling with the first device, the enterprise network may use a session initiation protocol (SIP) server positioned in the enterprise network, wherein the signaling occurs between the SIP server and the first device via an enterprise private branch exchange (PBX) positioned in the enterprise network if the first device is in a cellular network and occurs directly between the SIP server and the first device if the first device is in an Internet Protocol (IP) network. In performing the signaling with the second device, the enterprise network may use the SIP server and the signaling between the SIP server and the second device occurs via the enterprise PBX. The plurality of digits may be received via dual-tone multi-frequency (DTMF) signaling from the first device. The method may further comprise obtaining, by the enterprise network, caller identification (ID) information from the first device. The caller ID information may be received via dual-tone multi-frequency (DTMF) signaling from the first device. The caller ID information may be received when the first device registers with a session initiation protocol (SIP) server in the enterprise network. The method may further comprise determining, by the enterprise network, whether the first device is allowed access to VCC functionality within the enterprise network based on the caller ID information. The method may further comprise transitioning, by the enterprise network, the first device from the first communication network to a third communication network that is external to the enterprise network, wherein the second media path established between the enterprise network and the second device for the communication session is maintained during the transition. One of the first and second communication networks may be a cellular network and the other of the first and second communication networks may be an Internet Protocol (IP) network.

In yet another embodiment, the present disclosure provides a method for use within an enterprise network comprising receiving, by the enterprise network, a call at a pilot number of the enterprise network from a second device that is not a client of the enterprise network, wherein the enterprise network designates a call received at the pilot number as a request for a voice call continuity (VCC) communication session, wherein the call identifies a first device that is a client of the enterprise network as a destination, and wherein the first and second devices are both located in communication networks that are external to the enterprise network and are not controlled by the enterprise network; identifying, by the enterprise network, whether the first device is registered with the enterprise network as available to the enterprise network via an Internet Protocol (IP) network; performing, by the enterprise network, signaling with the first device and the second device to establish the communication session between the first and second devices, wherein the establishment of the communication session is controlled by the enterprise network; establishing, by the enterprise network, a first media path between the enterprise network and the first device, wherein the first media path is anchored on a media gateway within the enterprise network, and wherein the first media path is a cellular bearer path if the first device is not registered as available via the IP network and is an IP bearer path if the first device is registered as available via the IP network; and establishing, by the enterprise network, a second media path between the enterprise network and the second device, wherein the second media path is anchored on the media gateway, wherein the first and second media paths connect the first and second devices for the communication session. In performing the signaling with the first device, the enterprise network may use a session initiation protocol (SIP) server positioned in the enterprise network, wherein the signaling occurs between the SIP server and the first device via an enterprise private branch exchange (PBX) positioned in the enterprise network if the first device is in a cellular network and occurs directly between the SIP server and the first device if the first device is in the IP network. In performing the signaling with the second device, the enterprise network may use the SIP server and the signaling between the SIP server and the second device occurs via the enterprise PBX. The method may further comprise determining, by the enterprise network, whether the first device is allowed access to VCC functionality within the enterprise network prior to establishing the first media path. The method may further comprise transitioning, by the enterprise network, the first device from a first communication network that is external to the enterprise network to a second communication network that is external to the enterprise network, wherein the second media path established between the enterprise network and the second device for the communication session is maintained during the transition. One of the first and second communication networks may be a cellular network and the other of the first and second communication networks may be the IP network.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. An enterprise network comprising:
   an enterprise private branch exchange (PBX) having a pilot number associated therewith, wherein the enterprise PBX is configured to communicate signaling information with a client of the enterprise network when the client is positioned in a cellular network that is separate from the enterprise network and is outside of the enterprise network's control, and wherein the enterprise PBX is further configured to communicate signaling information with an external device coupled to a PSTN that is external to the enterprise network;
   an enterprise IP-Public Switched Telephone Network (PSTN) media gateway configured to provide a first media path between the client and the enterprise IP-PSTN media gateway when the client is positioned in the cellular network, and further configured to provide a second media path between the enterprise IP-PSTN media gateway and the external device;
   a voice call continuity (VCC) Session Initiation Protocol (SIP) server configured to communicate with the enterprise PBX in order to perform signaling functions for the client via the enterprise PBX when the client is positioned in the cellular network, and further configured to communicate signaling information directly with the client when the client is positioned in an IP network that is separate from the enterprise network and is outside of the enterprise network's control; and
   a VCC media gateway configured to communicate with the enterprise IP-PSTN media gateway and the VCC SIP server and to receive digits corresponding to a destination number associated with the external device from the client after the client places a call to the pilot number, further configured to anchor the first and second media paths, and further configured to provide a third media path directly to the client when the client is positioned in the IP network and to anchor the third media path.

* * * * *